United States Patent
Stoltenberg et al.

(10) Patent No.: US 9,716,424 B2
(45) Date of Patent: Jul. 25, 2017

(54) METHOD AND APPARATUS FOR RADIAL ELECTROMAGNETIC POWER ARRAYS

(71) Applicants: Theodor P. Stoltenberg, Georgetown, TX (US); G. Michael Click, Georgetown, TX (US)

(72) Inventors: Theodor P. Stoltenberg, Georgetown, TX (US); G. Michael Click, Georgetown, TX (US)

( * ) Notice: Subject to any disclaimer, the term of this patent is extended or adjusted under 35 U.S.C. 154(b) by 405 days.

(21) Appl. No.: 14/312,633

(22) Filed: Jun. 23, 2014

(65) Prior Publication Data
US 2015/0048695 A1    Feb. 19, 2015

Related U.S. Application Data

(60) Provisional application No. 61/838,559, filed on Jun. 24, 2013.

(51) Int. Cl.
| | |
|---|---|
| H02K 41/02 | (2006.01) |
| H02K 41/03 | (2006.01) |
| H02K 35/02 | (2006.01) |
| H02K 7/075 | (2006.01) |
| H02K 16/00 | (2006.01) |

(52) U.S. Cl.
CPC ........... H02K 41/031 (2013.01); H02K 7/075 (2013.01); H02K 16/00 (2013.01); H02K 35/02 (2013.01); Y10S 74/09 (2013.01)

(58) Field of Classification Search
CPC .......... H02K 41/02; H02K 41/03; H02K 7/09; H02K 16/00; H02K 35/02; H02K 40/031
See application file for complete search history.

(56) References Cited

U.S. PATENT DOCUMENTS

| | | | | |
|---|---|---|---|---|
| 4,542,311 | A * | 9/1985 | Newman ................ | H02K 33/16 310/13 |
| 6,137,195 | A * | 10/2000 | Chitayat ................. | A61M 1/34 310/12.24 |
| 6,914,351 | B2 * | 7/2005 | Chertok ................. | H02K 35/02 310/12.26 |
| 2010/0289359 | A1* | 11/2010 | Knaian .................. | H02K 21/04 310/83 |
| 2012/0091940 | A1* | 4/2012 | Nashiki ................ | H02K 19/103 318/701 |

* cited by examiner

*Primary Examiner* — Dang Le
(74) *Attorney, Agent, or Firm* — Rick B. Yeager

(57) ABSTRACT

Multiple arrays of linear motors and generators are combined in a radial configuration to provide high mechanical efficiency to deliver power in a single plane of motion to a common crankshaft. Magnet core assemblies for the motors and generators use powerful rare earth magnets positioned within an outer flux containment shell with a highly-magnetically-permeable ferrous-alloy to provide high power density. The motor magnet stack is attached directly to a link rod that connects to the crankshaft. Pulsed power is provided to electromagnetic coils coils by microcomputer control, and coil energy is recovered at the ends of the linear stroke. A controller energizes the coils in certain combinations of coil location and polarity in order to produce bi-directional mechanical motion. Energy that is released when coils are switched off is harvested as voltage pulses returned to standby batteries or capacitors, or the electrochemical cells.

19 Claims, 20 Drawing Sheets

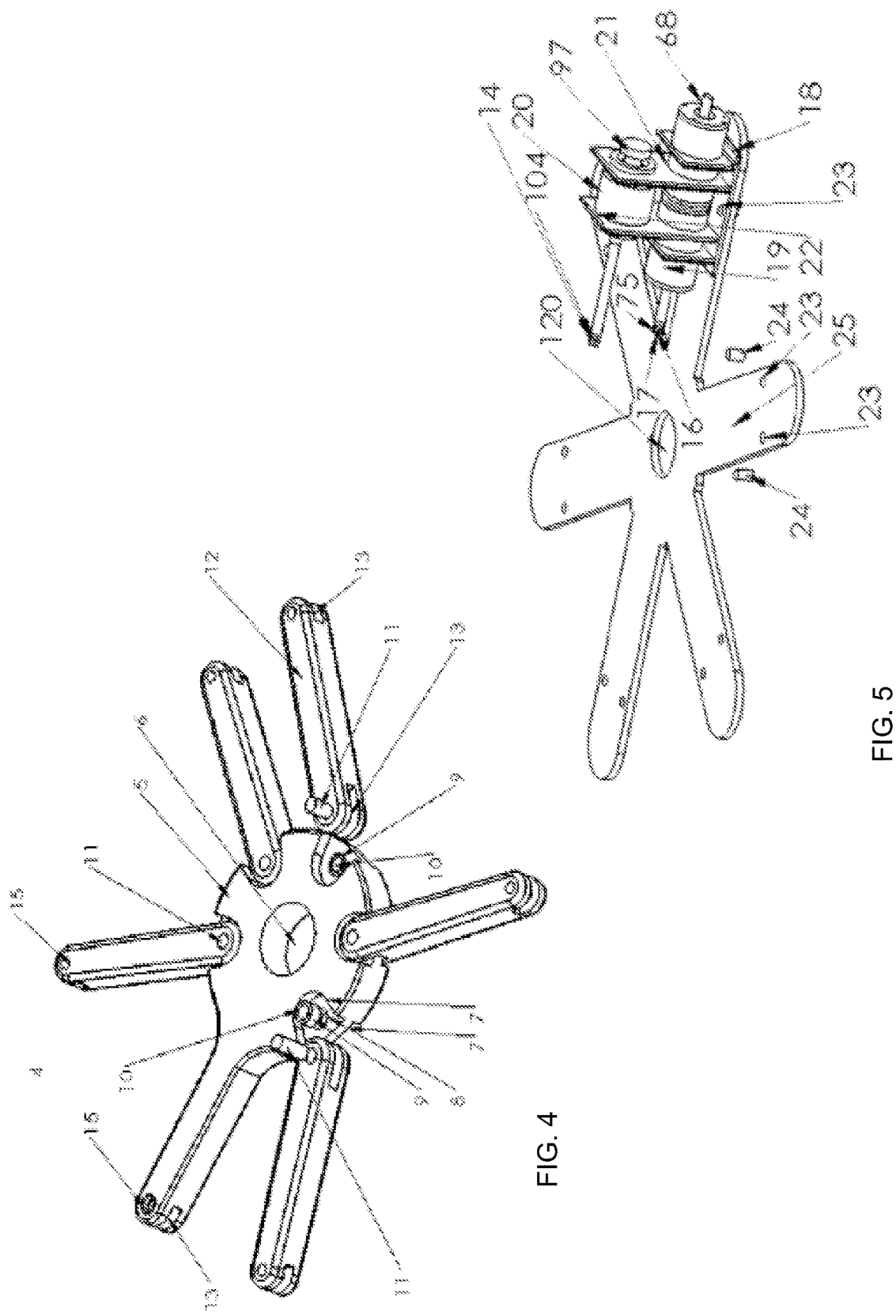

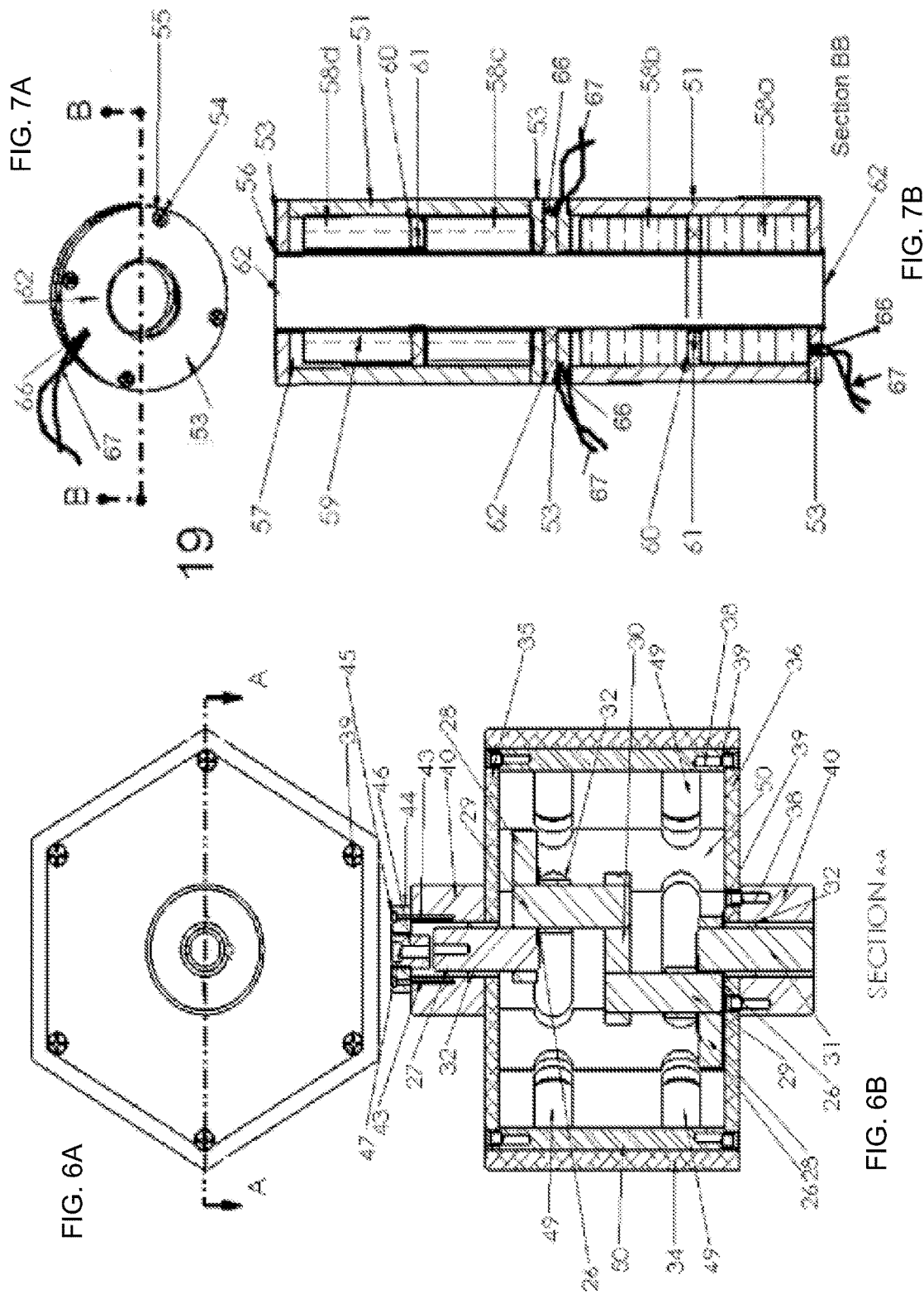

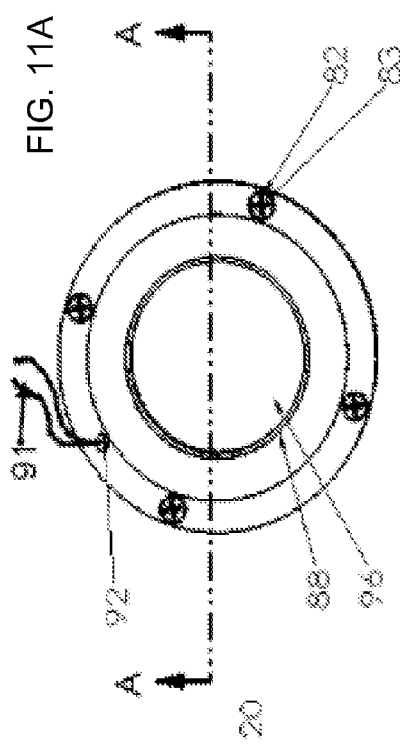
FIG. 11A
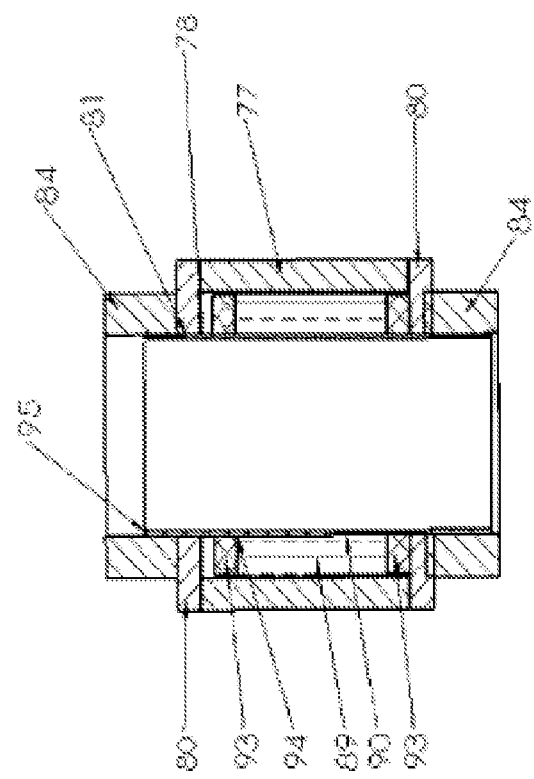
FIG. 11B SECTION A-A

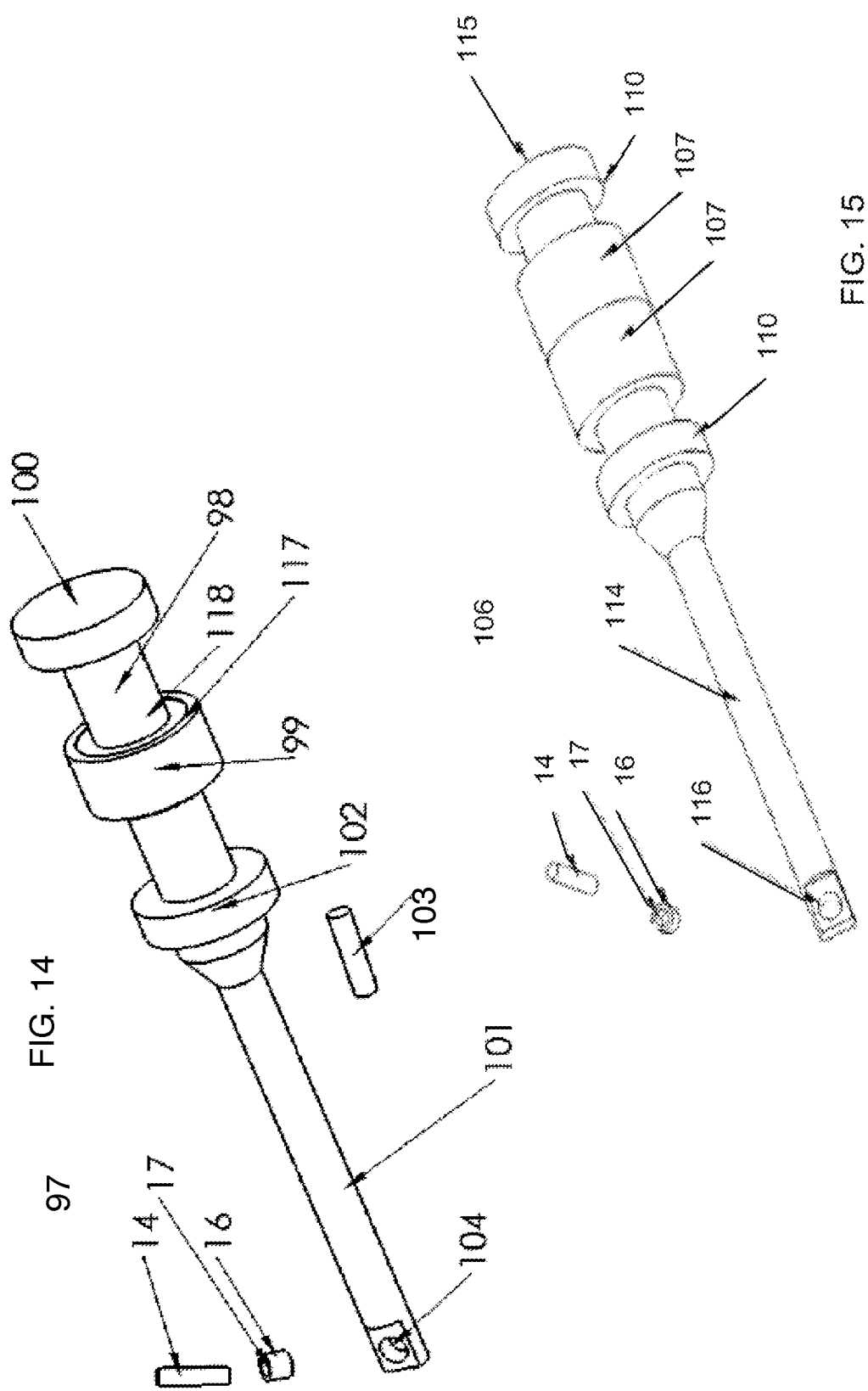

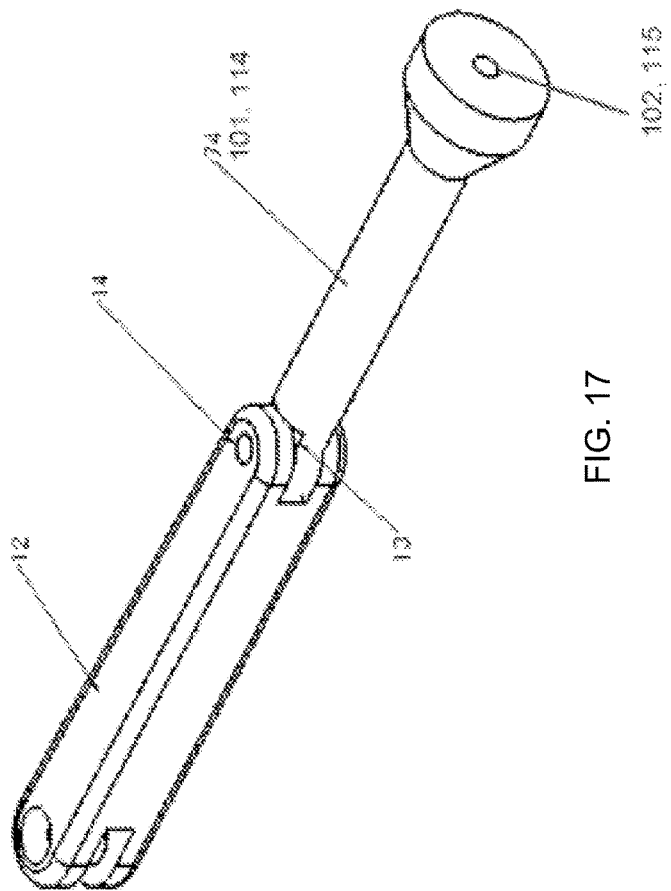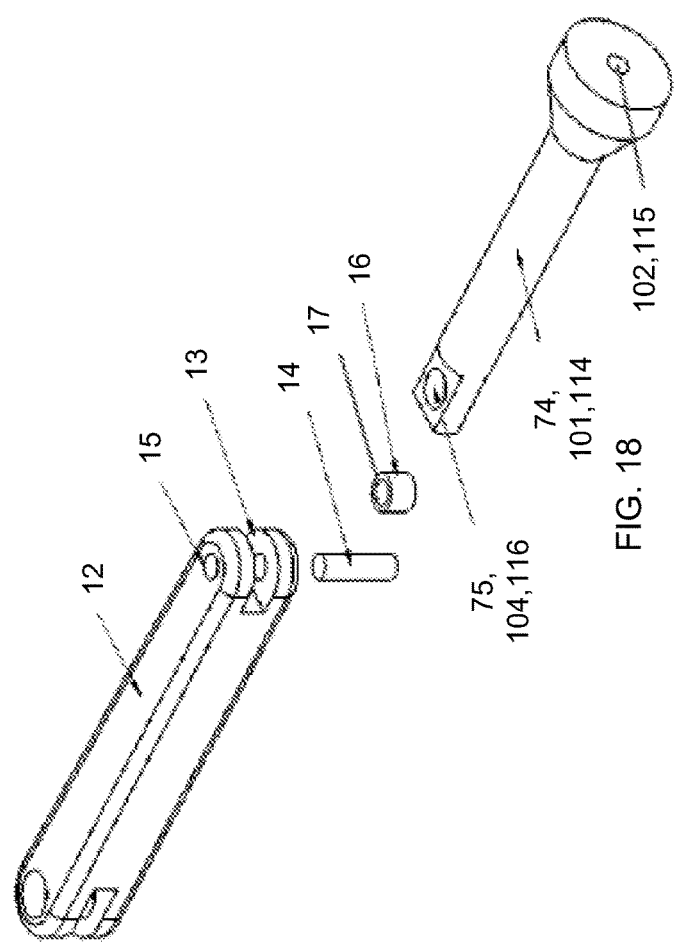

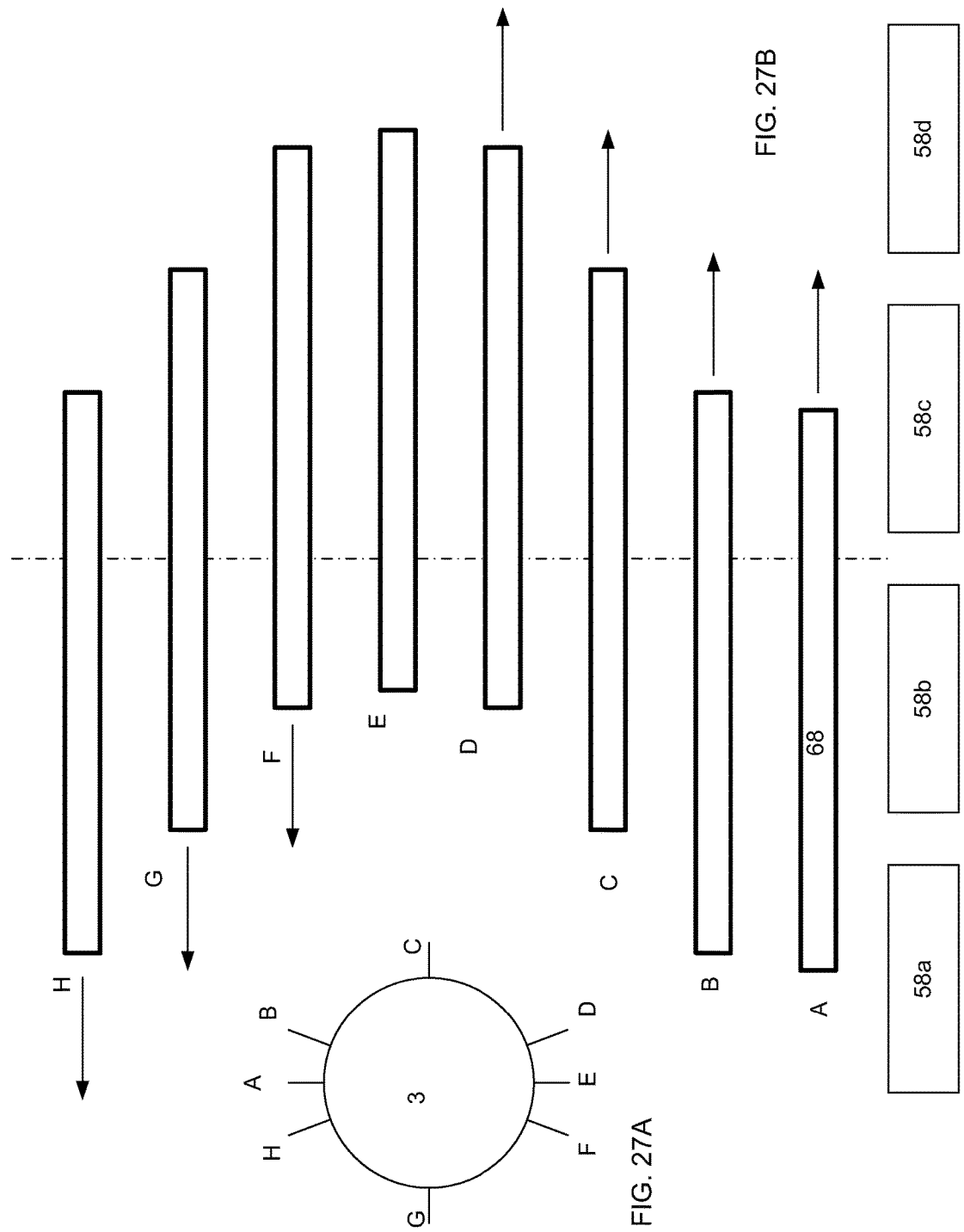

METHOD AND APPARATUS FOR RADIAL ELECTROMAGNETIC POWER ARRAYS

RELATED APPLICATIONS

This is a US non-provisional patent application. This application is related to U.S. Provisional Patent application No. 61/838,559 filed Jun. 24, 2013 by applicants, and claims the priority of that filing date.

BACKGROUND

Field of the Invention

The field of the invention relates generally to a radial array of reciprocating electromagnetic motors sharing a crankshaft. More particularly, the motors comprise a magnetic actuator with rare earth permanent magnets; wire coils; and a magnetically-permeable, iron-containing enclosure that conducts magnetic flux produced by the magnets and electric coils.

Prior Art

History is replete with examples of human efforts to make tools that would multiply the energy and power of an individual being. Most exemplary is the contribution of Archimedes, omnipresent since ancient times. Others such as DaVinci during the renaissance, and Watt, who ushered in the industrial revolution, built machines that inculcated the mechanical principles brought forth by Archimedes. James Watt's use of reciprocating power delivery, using the expansive power of steam to drive a piston enclosed in a cylinder, became the motive power enabler of the current age. The Archimedes screw became a propeller and soon found its way attached to the end of a drive shaft driven by Watt's cam. Watt's concept of multiplying power delivery by attaching multiple, reciprocating pistons along the axis of a common drive shaft, not only resulted in the massive steam engines used in locomotives and steam ships, but was the concept leveraged by Otto and others in developing the internal combustion engine. Otto replaced Watt's steam with a combustible mixture of hydrocarbon vapors and air and provided an electromechanical source of spark to ignite the mixture. Many of the valve and mechanical linkage concepts used by Watt and others to introduce steam under pressure into a cylinder, to extract mechanical energy from a piston inside the cylinder as connected to a drive shaft, and to exhaust the spent vapor from the cylinder, were used and improved upon to handle combustible and exhaust gases in the internal combustion engine. The internal combustion engine as used in the automobile soon became the most populous reciprocating engine in the world—and, the most polluting.

Steam power gave rise to the favorable social and economic conditions that facilitated the development and distribution of electrical energy. Faraday's discoveries were leveraged and improved upon by Edison, but it was Tesla who brought us into the practical age of electricity and magnetism by his development of rotary, AC power. It followed that both AC and DC electromagnetic motors and linear actuators such as electrical solenoids would displace both steam and internal combustion engines in many fixed applications based on utility, ease of use, and economics afforded by electrical power. Mobile engine applications are still dominated by the internal combustion engine, but that situation could change.

One example of replacing internal combustion in a reciprocating engine with an electromagnetic solenoid is disclosed by Teal in U.S. Pat. No. 4,093,880. Teal disclosed not only the use of a solenoid to replace the combustion cylinder and all of the valves, linkages, carburetor, fuel pump, and other combustion-related structures, but also disclosed the value of and a mechanism to recover energy from the pulses used to energize and discharge the massive coils he used to power his engine. Further disclosure of pulsed electrical energy recovery is provided by Bedini in U.S. Pat. No. 6,392,370 and U.S. Pat. No. 6,545,444.

The practical need to concentrate power-producing machinery in a limited space was discerned in early $20^{th}$ Century as regards powering aircraft. One of the most favorable engine topologies was the use of a circular structure to support a cluster of reciprocating, internal combustion cylinders arranged radially around and connected to a short, central drive shaft using a most innovative crankshaft. This concept reached its zenith during the 1930's with the production of the Pratt and Whitney series of radial engines that became of immense import during WWII. The Wright Cyclone, variant of the Pratt and Whitney Radial "Wasp" aircraft engine that powered the Boeing B17 Bomber was of inestimable importance to the Allied war effort. Even though the jet engine displaced radial internal combustion engines for most aircraft, patents for new versions of radial combustion engines continue to appear, many for use in the model airplane business.

As efforts intensified to pack more power in a smaller electromagnetic package, a major innovation appeared in 1982 in the form of the Neodymium-Iron-Boron (NIB) magnet developed by General Electric and Sumitomo Metals. NIB magnets have rapidly become the magnet of choice because of superior magnetic strength and stability. However, NIB magnets present nearly impossible problems of application in reciprocating equipment in the presence of iron or other ferromagnetic materials. The reasons are disclosed in many citations including Gosvener in U.S. Pat. No. 8,324,763. In short, an electromagnet typically has an iron or iron metal alloy at the center of its coil. If a plunger that is made of, or contains, a Neodymium magnet comes close to the iron core of a solenoid coil, then the magnet typically grabs onto the iron core with such force and tenacity that motion is halted and extraordinary force is required to free the mechanism. This limits the use of NIB in typical solenoids. Conversely, if NIB is used in a reciprocating motor, most if not all ferrous-derived metal is removed from the motor design. The absence is a serious loss of opportunity because iron or ferrous-derived material has no known practical equal in concentrating and conducting magnetic flux.

While the social and economic impact of reciprocating motors and actuators has been generally quite favorable, there are some emerging challenges. The internal combustion engine, despite its relative poor efficiency and a cumulative burden of pollution, has benefited greatly from plentiful and cheap oil. Electrical generation that is fossil-fuel based has its pollution problems, too, and electrical distribution grids are proving increasingly unreliable with increased age and load. Furthermore, population growth has put tremendous pressure on the world's rapidly-dwindling resources. Intense competition between major countries for energy and materials continues to grow and the infrastructure needed to supply those resources has come under severe stress. Although there have been some major technological breakthroughs such as solar cells and NIB magnets, alternative, renewable energy production has lagged because it is generally viewed as not cost-effective. Advances are needed in all general areas of energy production, distribution, and utilization. Because of its historical importance and broad utilization, improved reciprocating motors and generators are required to fully utilize the performance potential of NIB magnets and stronger magnets, or magnet arrays, of the future. Every opportunity to recycle energy so as to produce more work is highly desirable and energy system concepts that combine technologies from different areas that hold promise to better utilize both conventional and renewable energy sources should be exploited.

It has long been recognized that combining the piston connections of an internal combustion engine into a single plane of applied power produces a far superior engine in terms of power density, maintainability, commonality of spare parts, minimal moving parts, simplicity and efficiency.

While radial configurations of internal combustion engines provide improved mechanical system efficiencies, there are inherent thermal inefficiencies (a significant part of the fuel energy is lost in waste heat) as well as inherent mechanical inefficiencies (such as piston friction). Eliminating components of the internal combustion mechanism and replacing their function with a superior reciprocating electromagnetic motor would produce an even better radial engine. In this specification, the term "motor" means a single electromagnetically-actuated, reciprocating mechanical energy producing device; and the term "radial engine" means a collection of motors connected to a common drive shaft in a single geometric plane of connection and rotation.

SUMMARY

Linear Actuator

In one embodiment, linear elements comprise a combined magnet core assembly having a hollow support tube, a magnet stack, and coils. The combined magnet core assembly is contained within an outer flux containment shell comprising a highly-magnetically-permeable, split hollow structure of ferrous-alloy providing two or more separate parts along the axis of the support tube. In one example, the outer flux containment shell is an exterior canister structure where each of two portions contains half of the coils and some portion of the magnet stack, such portion at any one time being based on the energized pattern of the coils.

In one example, the magnet stack is attached directly to a link rod that connects to a crankshaft that powers a mechanical load such as a flywheel, a generator or an inertial load.
Motors In one embodiment, an improved electromagnetically-actuated linear motor, effectively utilizes highly magnetically permeable ferrous-derived metals in combination with Neodymium magnets. It has been here-to-fore deemed impractical to combine iron structures with powerful rare earth magnets, such as Neodymium magnets, in a reciprocating motor or actuator, because of lockup.

In one example, a reciprocating direction of motion is produced by a cylindrical magnet stack comprising one or more cylindrical NIB magnets of substantially the same diameter. The magnet stack is radially centered within a hollow, non-conductive and non-magnetic cylindrical support tube that holds thinly-enameled electrical coils, wound about the outer surface of the tube, or within self-supported coils, where each coil is affixed at a specific location along the axis of the tube. In another example, the support tube is eliminated, and the magnet stack is positioned within a free-standing coil.

The electro-magnetic centers of the otherwise hollow coils are arranged axially asymmetric to the Bloch wall of the magnet stack as contained within the hollow tube or free-standing coil. A Bloch wall is a narrow transition region at the boundary between magnetic domains, over which the magnetization changes. The cylindrical magnets have a central circular mounting hole that will accept a non-magnetic drive rod with end caps, and the cylindrical magnet stack can move in reciprocal motion within the confines of the tube or coil as supported and driven by its central drive rod.

Electromagnetic coils are used as part of a motion-control mechanism for driving the linear electromagnet motor. A controller energizes the coils in certain combinations of coil location and polarity in order to produce bi-directional mechanical motion.

Radial attraction between the cylindrical surface of the magnet stack and the induced magnetism in the iron-containing canisters cancel one another, and do so within mechanical limits established by the stroke of the motor. Radial magnetic forces, due to radial symmetry, work to center and levitate the magnet stack and thus achieve radial equilibrium and permits rapid reversal of direction of the magnet stack. The resulting overall low friction is of significant benefit to motor operation and stability.

In one embodiment, an energy recovery mechanism is provided so that energy stored in the motor's electromagnetic coils is recovered.
Generators In developing the linear reciprocating motor concept, it was discovered that many of the electromagnetic principles of the motor design could be applied to a companion linear generator. Further, linear generators could be combined in a similar radial array as the linear motors and, when the generator array was mounted on the same crankshaft as the linear motor array, the resulting engine had a built-in load of equal or even greater utility than just shaft power. A very useful motor-generator system resulted with a built-in ability to recover much of the motor excitation power and return that energy to the front end of the system.

Magnetic lockup, typical of conventional systems, between the generator magnet and the iron in the enclosure is prevented by radial symmetry, by limiting the length of stroke inside the enclosure, and by extending the ends of the outer, magnetic enclosure axially so as to minimize residual, undesirable magnetic fringe attractions.
Energy Recovery with Pairs of Motors and Generators In one embodiment, electrical motors drive one or more electrical generators. In one example, six linear reciprocating electromagnetic motors drive a crankshaft that provides mechanical motion to six linear reciprocating electrical generators.

In one embodiment, the rotary motion of a crank shaft drives an armature that is magnetically polarized in the close proximity to one or more electrical, thinly-insulated metal wire windings to induce electrical energy in the windings to power an electrical load. The reciprocating motion moves a permanent magnet in the presence of a coil and thus induces an alternating current in the coil and any electrical load connected to that coil. In one example, the reciprocating motion moves a radially-polarized, permanent Neodymium ring magnet mounted on a magnetically-permeable, solid support cylinder that moves inside a hollow, non-conducting tube. The tube provides support for a multi-turn, electrically-conductive thinly-insulated metal wire coil as wound about the outside of the tube for generating electrical power. In other examples, a free standing self-supporting coil may be utilized.

Radial symmetry ensures that electromagnetic coupling is continuously maximized between the coil and the radially-polarized magnet thus maximizing reciprocal motion-induced electromagnetic flux in the coil. An enhanced return flux path is provided for completing the generator armature magnetic circuit by enclosing the magnet-on-armature, hollow tube, and generator coil within a ferrous metal derived magnetic enclosure.

In one embodiment, a microcomputer controls the power pulses to an array of linear motors, and reactive energy that is released when coils are switched off, is harvested to provide a major benefit to the overall efficiency of operation. In one example, the energy can be returned to standby batteries or capacitors. In another example, the energetic recovery pulses can be returned to electrochemical cells that can produce various products such as Brown's fuel gas from water.

Efficiency is further heightened by a strong magnetic coupling enforced by the ferrous metal outer flux containment enclosures. Such energy recovery is synchronized by the action of the controller as part of the overall system control strategy, where the system has an external power source in combination with radial arrays of linear motors and generators with related wiring. When an alternative energy source, such as solar power, provides power to the current invention, the combined increase in efficiency is significant.

Radial Arrays

In one embodiment, multiple arrays of the motors and generators are combined in a radial configuration to provide high mechanical efficiency and the ability to scale power output. The array of linear electromagnetic reciprocating motors in a radial structure delivers power in a single plane of motion to a common crankshaft. The crankshaft powers a nearly mirror image of the radial motor array but the elements in the driven array are linear generators that strategically extract excitation from the crankshaft in a single, unified plane of rotary motion. Such topology provides significant power density, scalability, reliability, common spare parts, and synchronized operation from a single controller.

A relationship is established and rigorously enforced between the achievable reciprocating range in motion of the linear elements of the motors and generators. Radial offset between sections of the crankshaft set the stroke of the engine. Thus, the spatial distribution of Neodymium magnets within containment by ferromagnetic materials produces strong magnetic interactions that both establish and limit the achievable range of motion. What motion that can be achieved electro-magnetically matches that motion that can be delivered mechanically by the crankshaft.

The increase in power density and flexibility of the electromagnetic devices will enable alternative electrical energy sources to function far more effectively in powering homes and businesses, either stand alone or connected to the electrical grid, and do so with little or no pollution.

BRIEF DESCRIPTION OF THE DRAWINGS

These and other features, aspects, and advantages of the present invention will become better understood with regard to the following description, appended claims, and accompanying drawings where:

FIG. 4 is a top view of a drive rod array of the radial engine of FIG. 1.

FIG. 5 is an oblique view of a tandem assembly of the radial engine of FIG. 1.

FIG. 6A is a top view of a crankcase for the radial engine of FIG. 1.

FIG. 6B is a half-sectioned (A-A) view of a slotted-wall crank case of the radial engine of FIG. 1.

FIG. 7A is a front view of a magnetic motor assembly of the radial engine of FIG. 1.

FIG. 7B is a half-sectioned (B-B) view of a magnetic motor assembly of FIG. 7A.

FIG. 11A is a half-sectioned (A-A) view of a generator assembly for a generator in the radial engine of FIG. 1.

FIG. 11B is a half-sectioned (A-A) view of the generator assembly of FIG. 11A.

FIG. 14 is an exploded view of generator components in FIG. 13.

FIG. 15 is side perspective view of a super-pole-based embodiment of a Generator Armature Assembly.

FIG. 17 is a typical pivot connection of the radial engine of FIG. 1.

FIG. 18 is an exploded view of the components of the radial engine of FIG. 1.

FIG. 27A is a cross section view of the crankshaft of the radial engine of FIG. 1 illustrating different positions during a revolution.

FIG. 27B is a diagram showing the magnet stack position and direction at the positions designated in FIG. 27A.

DETAILED DESCRIPTION

Linear Actuators

Figure 1:
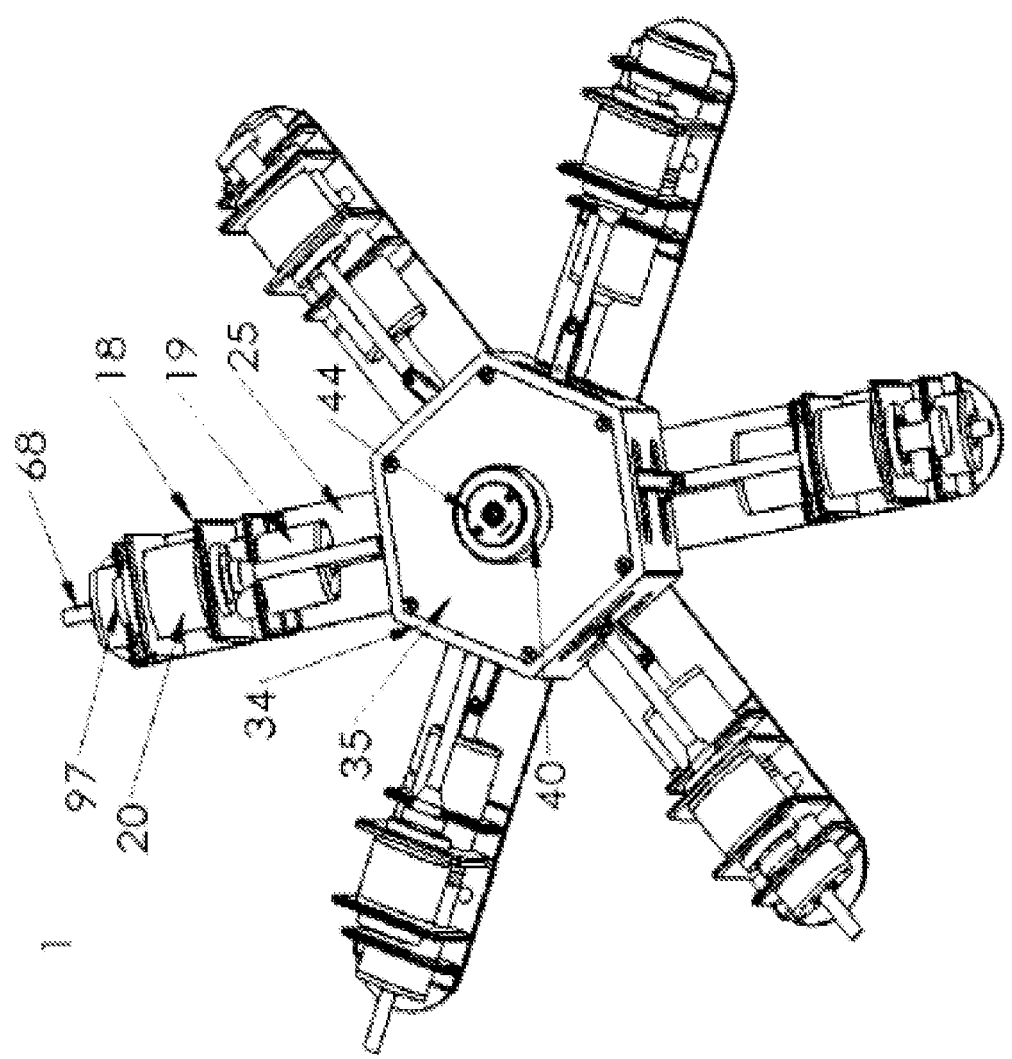
FIG. 1 is an angular relief view of an embodiment of a radial engine.

As described below, improved linear actuators may be used in motors, generators, prime movers, and systems.

Ferrous Properties and Flux Containment

A magnetic circuit behaves in a similar fashion to an ordinary electrical circuit in that magnetic elements can have "magnetic conductivity" or magnetic resistance, and there are limits to how much magnetic current a structure can carry before saturation. When Neodymium magnets are used in a device, it's not uncommon to experience magnet induced flux densities near 1.5 Tesla. Most common materials like ferrites and carbon steels saturate at less than a third of this flux density—between 0.2 to 0.5 Tesla. In applicant's experience, properly annealed ASTM A848 metal provides the highest commercially available flux density. As improved materials become available, those materials may be used for containment structures in linear elements.

Specifying ASTM A848 metal and invoking an appropriate annealing process gives the linear elements significant magnetic performance enhancements over other materials. The results are increased shaft power and decreased waste heat. Only a few suppliers provide the preferred raw metal for high-performance magnetics. These metals chemically meet or exceed ASTM A848 raw alloy standards. By "raw" it is meant that it is the user's responsibility to anneal the raw materials so as to enhance and maximize the raw metal's latent magnetic properties.

Performance is largely a function of the time-temperature history of the metal and its chemical composition. For example, annealing special ferrous metals, when properly performed, will maximize the magnetic permeability and saturation flux density of the outer shell flux containment canisters in linear elements. Optimum magnetic flux path performance is critical to achieve the aforementioned performance enhancements—in short, a far superior embodiment of magnetic principles over conventional approaches is ensured by selecting the correct material and annealing it correctly. Rather than shun the use of ferrous metal in a reciprocating magnetic motor that uses Neodymium magnets, applicants embrace the use of ferrous material because the quality of ferrous material and the location of components circumvent the problems encountered in conventional systems when the designers attempt to combine Neodymium magnets in the near presence of ferrous structures.

Example Annealing Process

In an example annealing process, the sample is placed in a stainless steel bag such as provided by SenPak to eliminate oxygen exposure to the sample. The sealed bag placed in a muffle furnace or other suitable annealing furnace of 0-1000 deg Centigrade range or greater. An annealing is performed by ramping the oven temperature from ambient to 845 degrees C. at a ramp rate not to exceed 2 degrees C/minute; the oven temperature is held at 845 deg C for 2 hours; the oven temperature is ramped from 845 degrees C. to 500 degrees C. at a ramp rate not to exceed 1 degrees C/minute; and the oven temperature is ramped from 500 degrees C. to ambient at a ramp rate not to exceed 2.5 degrees C/minute.

Shell Fabrication Methods

The flux canisters shown in the figures above are solid, metal cylinders made of ASTM A848 magnetic metal stock which provided approximately a 10× improvement over the floral wire wound shell. The parts were deliberately over sized in terms of wall thickness so as to avoid magnetic saturation of the parts during system operation. Air gaps in a magnetic assembly cause loss in magnetic flux capability and can lead to flux saturation. Air gaps, such as between the magnet stacks and motor shell liners, could be decreased via tighter tolerances that may be obtainable with a lamination process and more precise machining Ferrous magnetic flux structures such as flux containment shells, end caps, spacer washers, etc., can be fabricated from multiple layers of thin material. A shell made of laminations where the individual lamination layer is coated with a non-electrically conductive material such as thin plastic or shellac stops eddy currents from forming and thus reduces or eliminates magnetically-induced heating in the shell.

Thin sheets of 0.025 inch ASTM A848 metal are available for use in making laminations. In this example, the containment shell for a motor would require about 330 layers of magnetic metal, possibly coated with shellac, and bolted together.

One type of lamination is a washer embedded in a NIB magnet stack. Washers or spacers help to reduce the magnetic NIB material required to make a magnet stack. For example, just one or two NIB magnets may be used, with the rest of the magnet stack using thin laminations of properly-annealed ASTM A848.

Finite element analysis is a useful tool in exploring potential benefits of using odd-shaped parts in the containment shell or magnet stack, including parts built up using laminations.

Motors

FIGS. 5 and 7-10 show an example motor embodiment of a linear element.

In this example, a motor 19 is matched to the design and operational requirements of a radial array. Because of the density of the array and the need for maximum magnetic efficiency to achieve desired embodiment performance, the motor has significant performance benefit by using highly-permeable magnetic metal in the magnetic flux return path portions 51, 53 of the motor 19. Such metal eliminates the air gap that would otherwise appear thus significantly improving performance at reduced size provided the propensity for Neodymium magnets to lock up with iron-containing flux pathway components is eliminated.

Figure 8:
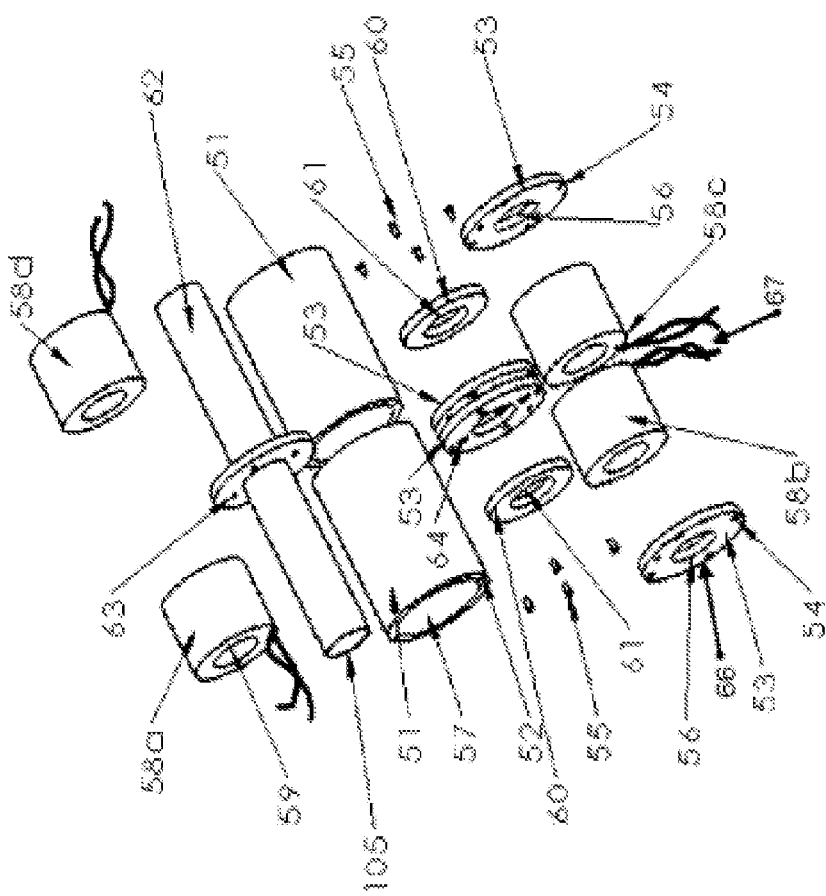
FIG. 8 is an exploded view of magnetic motor components for a motor in the radial engine of FIG. 1.

In this example, lock up, which is experienced in conventional systems, is eliminated by matching a magnet stack 68 comprised of four Neodymium magnets arranged axially S-N S-N S-N S-N in relative polarity to achieve a stack length of substantially twice the engine stroke. As shown in FIGS. 7 and 8, an enclosing canister-like structure was built to hold the magnet stack 68 and allow the stack to move axially inside the enclosure.

Magnet Stack Inner Core with Ferrous Outer Flux Containment Shell

In this embodiment, the ferrous-derived metal core of the typical solenoid is used as an outer, cylindrical canister and end caps are provided to enclose coils and a magnet stack. The next inner layer is one or more hollow, solenoid-like, thinly-insulated metal wire coils wrapped about the outer surface of a non-electrically conductive thin-walled coil support tube of sufficient inside diameter and length to allow a stack of two or more cylindrical Neodymium magnets, as mounted on a central non-magnetic rod, to fit inside the support tube and to move back and forth.

In these examples, the coil input pulses are encapsulated within a highly-intense, recirculating magnetic field that is substantially contained inside a ferrous structure as represented by the iron canisters and end caps. Recovered pulses have a higher voltage than the input pulses.

In operation, the magnet stack immediately polarizes the outer ferrous metal shell and centers itself in a levitated orientation. With this levitation, it is very easy to move the magnet stack back and forth axially inside the support tube for quite some distance depending on the length of the outer flux containment shell and the length of the magnet stack.

The amount of axial displacement of the levitated magnet stack can be manipulated to establish the desired stroke of a radial engine.

By electrically pulsing one or more coils, the magnet stack changes axial positions rapidly and with great force in an attempt to realign itself with the change in magnetic flux that was circulating inside the outer flux containment shell. Magnetic flux, much like electrical current, flows along the path of least resistance—in this case the high magnetic permeability outer flux containment shell. The shell is thick enough to accommodate the tightly-coupled magnetic flux from both the magnet stack (always present) and that from energized coils (intermittent). In one embodiment, the outer shell design is significantly enhanced when split into two separate stacked parts, with one part for each half of the mechanism.

In this example, the overall sum of canister 51 length and end Cap 53 lengths was set at substantially twice the stack length. The canister diameter allowed four motor coils 58a, 58b, 58c, 58d having a sufficient diameter 59 to encircle the magnet stack track 62. The coil lengths plus coil spacers 60 thickness in each of two canisters is substantially equal to twice the engine stroke. Because the magnet stack 68 acts as a long, singular bar magnet, the magnetic enclosure is broken into two canister identical sections 51a and 51b, one section for each magnetic pole, and of sufficient length to hold two motor coils 58.

The end caps of the magnetic containment canisters, because of their shape and location, take on the added role of "magnetic pole pieces"—that is, they focus the recirculating magnetic flux in the containment structures into the central channel of the assembly and thus enhance the interactive forces on the magnet stack.

When the coils 58 are energized, two aspects of magnetics come into play. First, any pole of a permanent magnet at or inside the inner edge, but not past the center, of an electrical coil that is energized at the same polarity causes a powerful ejection of the permanent magnet away from that edge. Second, any polarized bar magnet that is encircled by an electrical coil, and sufficiently past the coil center, will be forced to try and achieve magnetic equilibrium with that coil wherein the Bloch wall of the magnet will be forced to align geometrically with the Bloch wall of the energized coil. These conditions are achieved in each motor canister 51 for each cycle of the motor as dictated by the stroke of the engine. However, for each stroke of the magnet stack 68, only a single coil in each canister 51 is energized—that is, the coils are energized in pairs.

Coils

Figure 19:
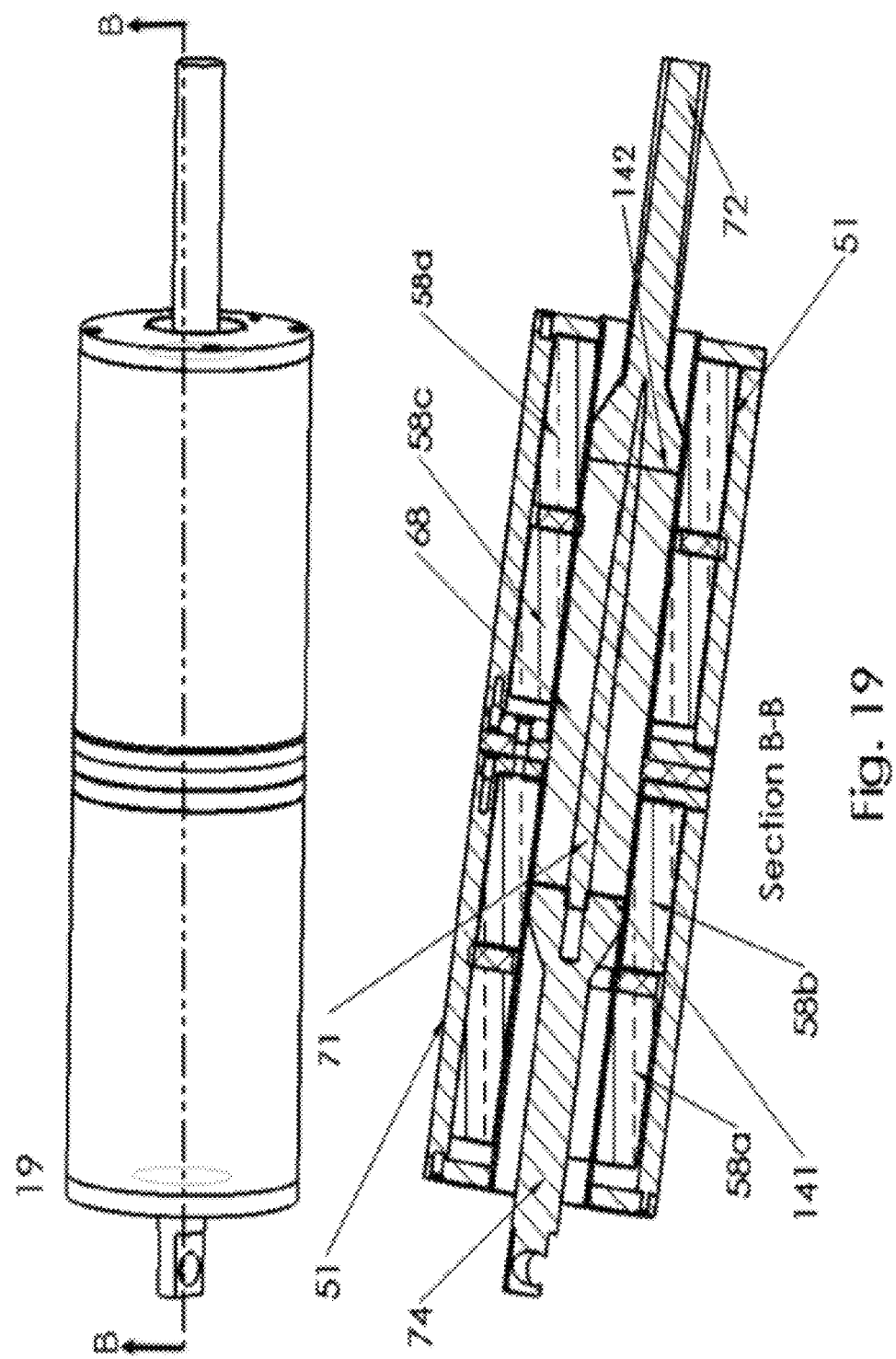
FIG. 19 is a front sectional view of a magnetic motor pending outstroke of the radial engine of FIG. 1.
Figure 20:
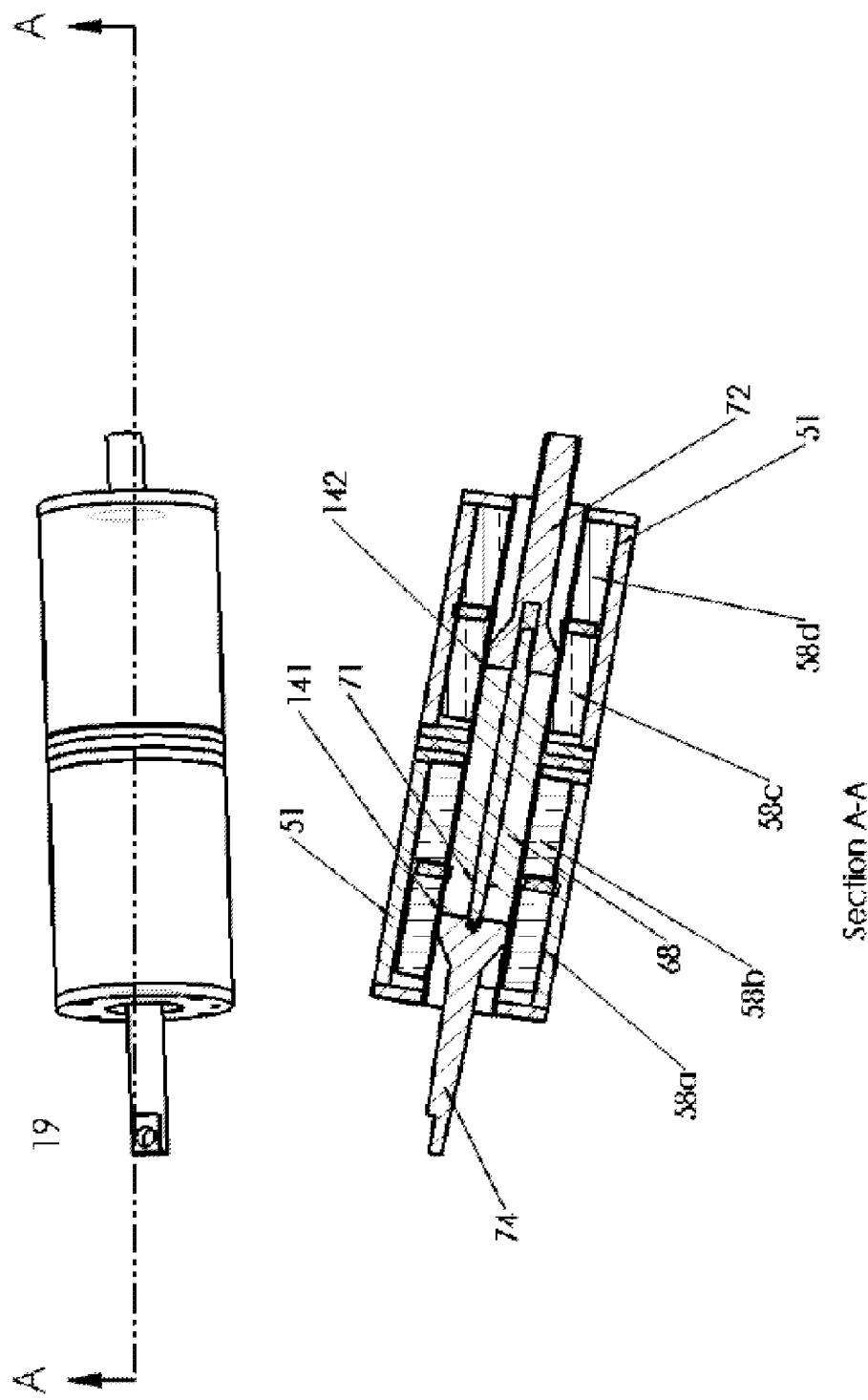
FIG. 20 presents a front sectional view of a magnetic motor pending instroke of the radial engine of FIG. 1.

The motor moils 58 are indicated by a letter suffix (58a, 58b, 58c, 58d) in FIG. 7 and in FIGS. 19 and 20 so as to distinguish their respective roles when energized.

FIG. 19 presents a front sectional view of a magnetic motor 19 complete with magnet stack 68 that shows the positions of the magnet stack 68 edges 141, 142 with respect to the motor coils 58 just prior to an outward motor 19 stroke away from the center of the crank shaft 3 where motor coils 58a and 58c will be energized.

FIG. 20 presents a front sectional view of a magnetic motor 19 complete with magnet stack 68 that shows the positions of the magnet stack 68 edges 141, 142 with respect to the motor coils 58 just prior to an inward motor 19 stroke towards the center of the crank shaft 3 where motor coils 58d and 58b will be energized.

In this example, coils 58a and 58d are wired to always act in repulsion and are located in the outward end portions of their respective motor canister sections 51a and 51b. Conversely, coils 58b and 58c are wired to always act in attraction mode and are located at the inner end portions of their respective magnetic canisters 51.

On the outward stroke, away from the crank shaft 3, coil 58a and coil 58c are energized push-pull, respectively. Conversely, on the inner stroke towards the crank shaft 3, coil 58d and coil 58b are energized push-pull, respectively. The engine stroke places the magnet stack 68 at the correct position at the end of motion for that just completed stroke to respond to the next set of coil 58 actions without the magnet stack 58 venturing too close to the end caps 53 and locking up. This sequence of coil 58 and magnet stack 68 actions is illustrated in FIGS. 19 and 20. In FIG. 19, the positions of the magnet stack 68 where the inner edge 141 is inside the edge of coil 58a and the outer edge 142 is past the inside boundary of coil 58c, and the magnet stack is at the end of its stroke inwards towards the crank shaft 3 and is in position for outwards movement away from the crank shaft 3.

Once the outwards stroke is completed, the magnet stack edges 141, 142 appear as presented in FIG. 20. The outwards stack edge 142 is well inside the inside edge of coil 58d and the inside stack edge 141 is well inside the boundary of coil 58b. The magnet stack 68 is now in position for the next stroke inwards when coil 58d is energized repulsion and coil 58b is energized attraction. Performance improvements are significant and power density is doubled with two active coils on each stroke, and lock up is eliminated. Furthermore, as contrasted to a 2-cycle or a 4-stroke internal combustion engine, every stroke of motor 19 is a power stroke—not one out of four.

FIG. 7A is a front view of a magnetic motor assembly of the radial engine of FIG. 1.

FIG. 7B is a half-sectioned (B-B) view of a magnetic motor 19 assembly comprising two iron-like canisters 51 with threaded assembly holes 52 at the ends of the canisters that accept machine screws 55 to mate with the mounting holes 54 in end caps 53. Each canister cavity 57, thus formed, can accept a pair of motor coils 58 with motor coil lead wires 67 that enter the canisters 51 through small access ports 66, and motor coil spacers 60. The center holes 59 of the motor coils and the center holes 61 of the motor coil spacers all align with the motor canister cavity 57—thus, an inner center pathway is provided for a magnet stack 68 to pass through a motor magnet 69 track and mounting flange/spacer 62 as placed into that pathway, complete with mounting holes 63 that mate with similar sets of mounting holes 64 in the inner end caps 53, so as to connect the two motor canisters 51 with machine screws 65 to one another and thus complete the motor assembly 19.

Motor coils 58 as presented in FIGS. 7 and 8 appear with shortened lead wires 67 so as to not to obscure the drawings. However, coil 58 properties are important to the operation of the invention, and those properties specific to said embodiments are discussed herein. Rather than waste valuable space and increase thermal resistance in the motor canisters 51 by using a plastic coil bobbin, the motor coils 58 used in one embodiment are free-standing—that is, formed without a bobbin.

Figure 9:
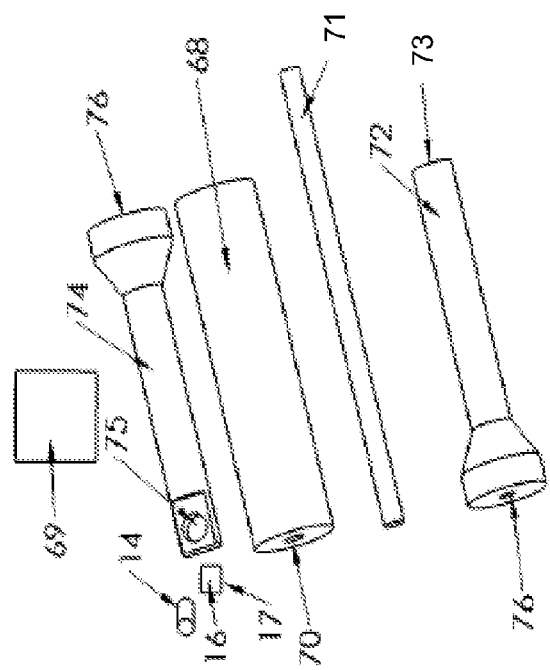
FIG. 9 is an exploded view of a magnetic actuator assembly for a motor in the radial engine of FIG. 1.
Figure 10:
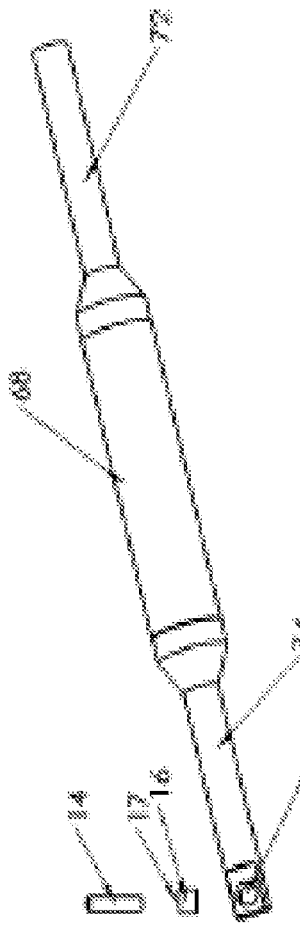
FIG. 10 is a side perspective view of the motor magnet stack for a motor in the radial engine of FIG. 1.

FIG. 8 presents an exploded view of the components presented in FIG. 7 showing a magnet stack cylindrical track 105. FIG. 9 is an exploded view of a magnetic actuator assembly for a motor in the radial engine of FIG. 1, showing a mounting shaft center hole 70, an outer most connection rod 73, and an inner most connection rod 76 with clevis-like hole that facilitates connection to a link rod. FIG. 10 is a side perspective view of the motor magnet stack for a motor in the radial engine of FIG. 1, showing a bearing center hole 17 for a clevis-like pin, and a hole 75 in the clevis connection for the connecting pin and its bearings.

In this example, enameled magnet wire that is further coated with a suitable bonding agent is used with exemplary 20 AWG size to form the coils for all motor coil 58 and generator coil 89 components. A conventional coil winder equipped with a special, removable bobbin may be used to wind a coil. A typical motor coil 58 requires 320 ft of 20 AWG enameled copper wire and 750 turns in the coil 58. During the winding operation, a small amount of Isopropyl Alcohol (IPA-99%) is dabbed onto the wound coil surface, layer-by-layer. The IPA causes partial cross- and intra-layer polymerization of the bonding agent sufficient to allow the coil to be removed intact and fully coiled from the winder bobbin. The coil is then dipped into IPA and placed in a vacuum oven at 90 Deg Centigrade for approximately one hour to finish polymerization and cure. The result is a free-standing, tight bobbin-free coil 58 that will slip over the magnet track 62 and almost fill the motor canister cavity 57 radially. Two such coils 58 plus coil spacer 60 will nearly fill a motor canister cavity 57 axially as well. Provision is made during the winding and curing operation to set the coil lead wires 67 in such a position that they can be extended out of the motor canister 51 through access ports 66 and terminated at a specific motor control board 130 assigned to that motor 19.

In this example, the coils are bifilar wound coils where the trailing end of one filament is folded back and connected to the beginning of the adjacent filament. The coils are positioned asymmetrically with respect to the magnet stack so that the pole of a magnet does not align with the center of any coil at the ends of the magnet stack stroke.

Figure 21:
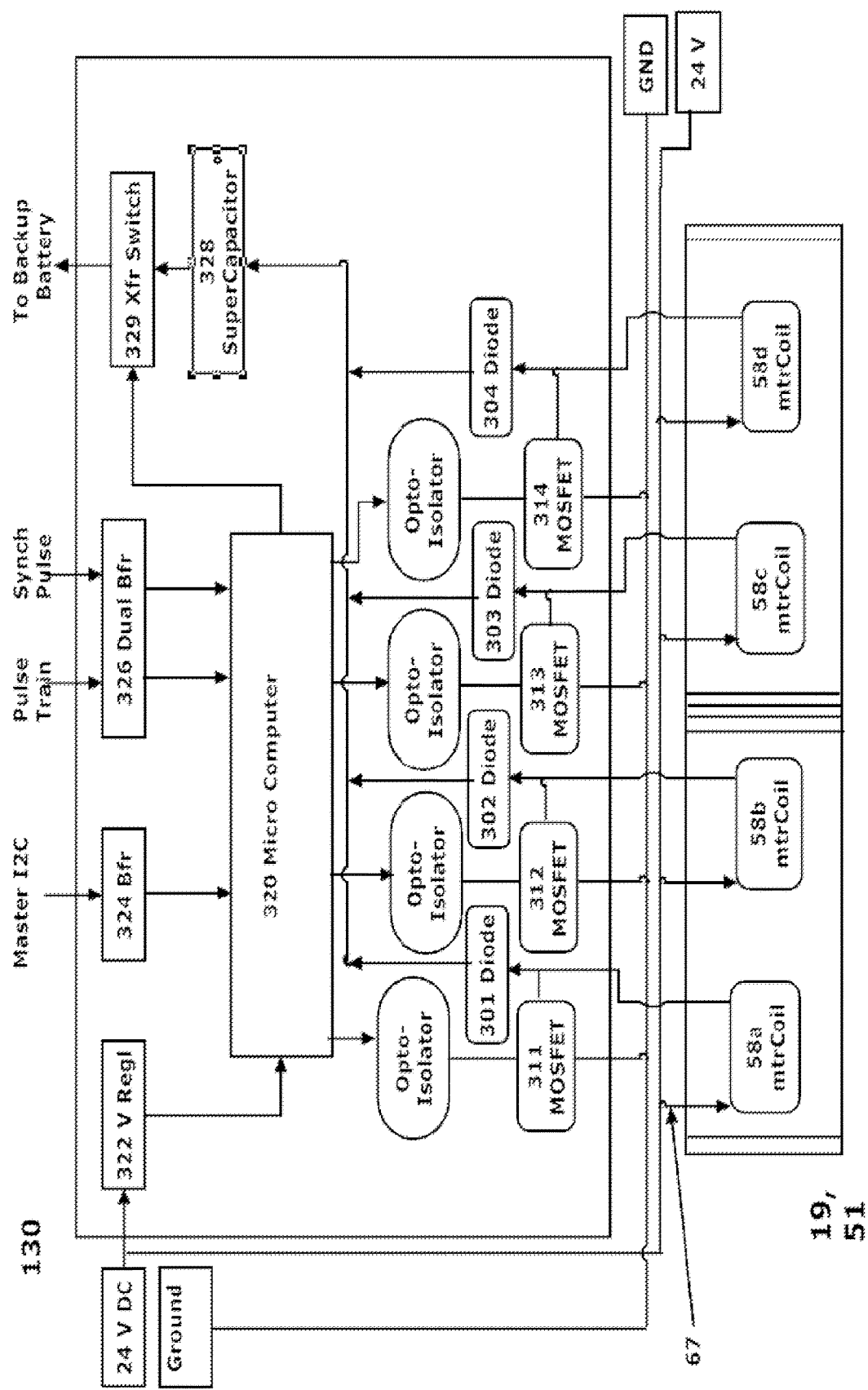
FIG. 21 is a functional block diagram showing the wiring between a typical magnetic motor and a typical motor control board.

Typical motor coil wiring 67 is shown in FIG. 21, which is a functional block diagram showing the wiring between a typical magnetic motor 19 and a typical motor control board 130.

Figure 26:
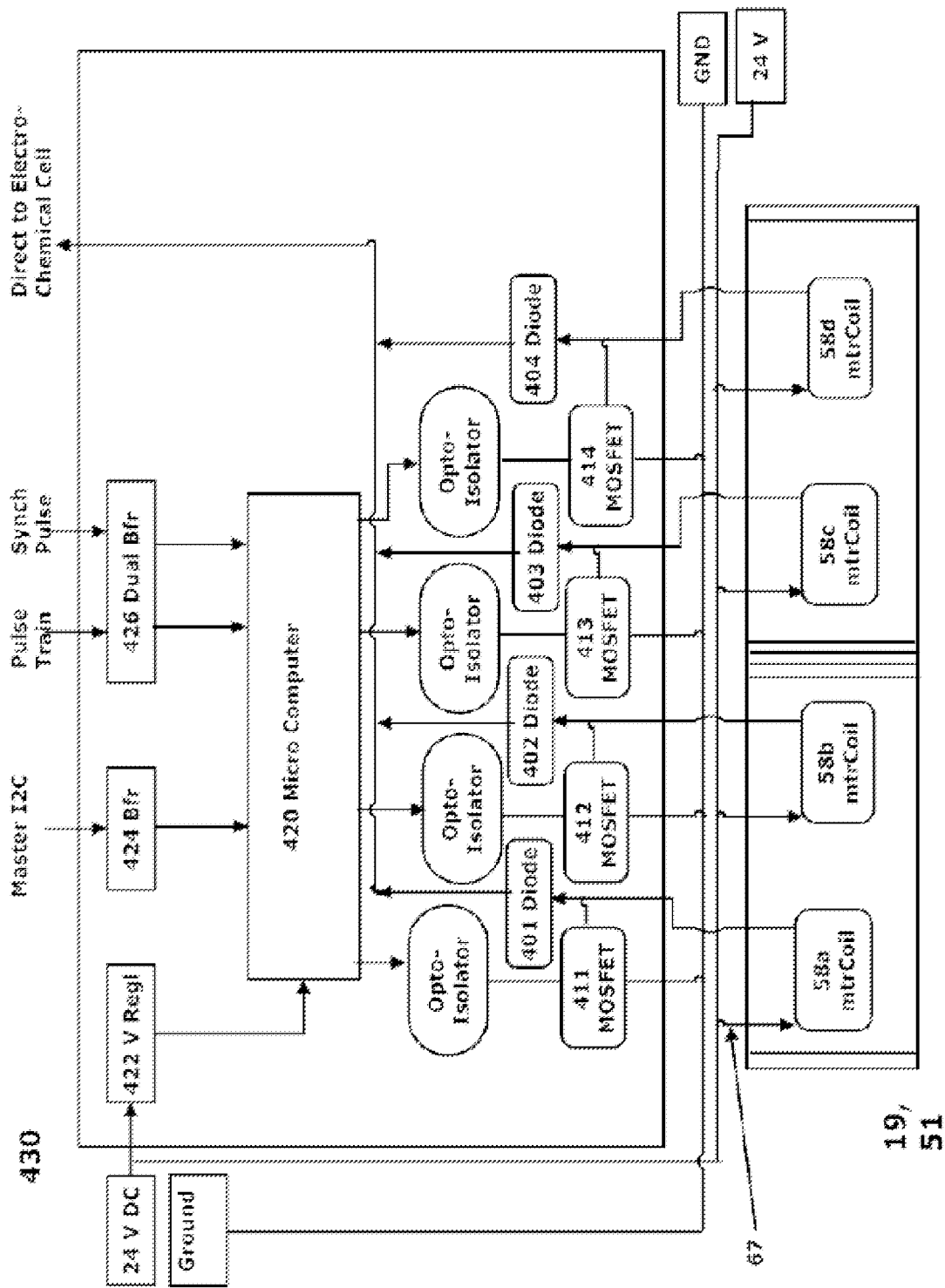
FIG. 26 is a functional block diagram showing the wiring diagram of the radial engine of FIG. 1.

In the case where regenerative back EMF pulses (also termed "reactive energy" pulses in this specification) are returned directly to an external electrochemical cell, said wiring is presented in FIG. 26 which is a functional block diagram showing the wiring between a typical magnetic motor 19 and a typical motor 19 control board 130 where back EMF pulses are returned to an electrochemical cell and/or standby battery.

Thermal Management

Thermal management is typically desirable, especially if the motors 19 are subjected to high loads as represented by high motor coil 58 duty cycle where the power pulses to the coils are on more than 50 per cent of each pulse period. High duty cycles can cause coil self-heating. Because the magnet wire is coated with a non-electrically conductive material, such insulators are also generally poor conductors of thermal energy. Efforts to limit those materials in the design are represented by self-standing coil fabrication as discussed above. A second step is to eliminate any air gaps and air pockets internal to the motor cavity 57 by fitting that space with a very thermally conductive material such as liquid crystal polymer that is an excellent electrical insulator but has a thermal conductivity far superior to air or plastic. Another example material is a thixotropic, filled grease where the filler is a thermally-conductive ceramic. The grease is especially useful because it retains its fluidity so it is possible to move the grease aside if an electrical repair were necessary at some future time. Such coil encapsulation provides an additional benefit of limiting or eliminating coil winding movement during coil pulsation that can lead to wire fatigue. An additional step to thermal management is to extend the bottom crank shaft 31 segment and mount an air cooling fan directly to the engine crank shaft 3 to provide forced convection cooling to the engine or provide another cooling means such as a Peltier cooler or a jacketed water cooling system. Such forced convection can be combined with mounting heat transfer fins made of non-magnetic metal to the surface of the canisters 51, a technique generally familiar to those experienced in the art.

Motor Control

Coordinated, distributed motor control is provided by a combination of components and sub-assemblies. One such sub-assembly is referenced in functional block diagrams FIGS. 21 and 26 of a motor control board 130 that shows wiring 67 from a typical set of motor coils 58. Power and ground wires from a battery-based power supply connect to each motor control board 130 and to a master controller 129.

FIG. 21 is a functional block diagram showing the wiring between a typical magnetic motor and a typical motor control board 130. In this example, the motor control board 130 includes MosFet Power Transistors 311, 312, 313, and 314 for coils 58a-58d; a microchip 320; a voltage converter from a 24V input power to 12 VDC 322; a serial I2C input buffer 324; a dual input buffer 326; a capacitor 328; a transfer switch 329; and diodes 301, 302, 303, and 304.

Figure 25:
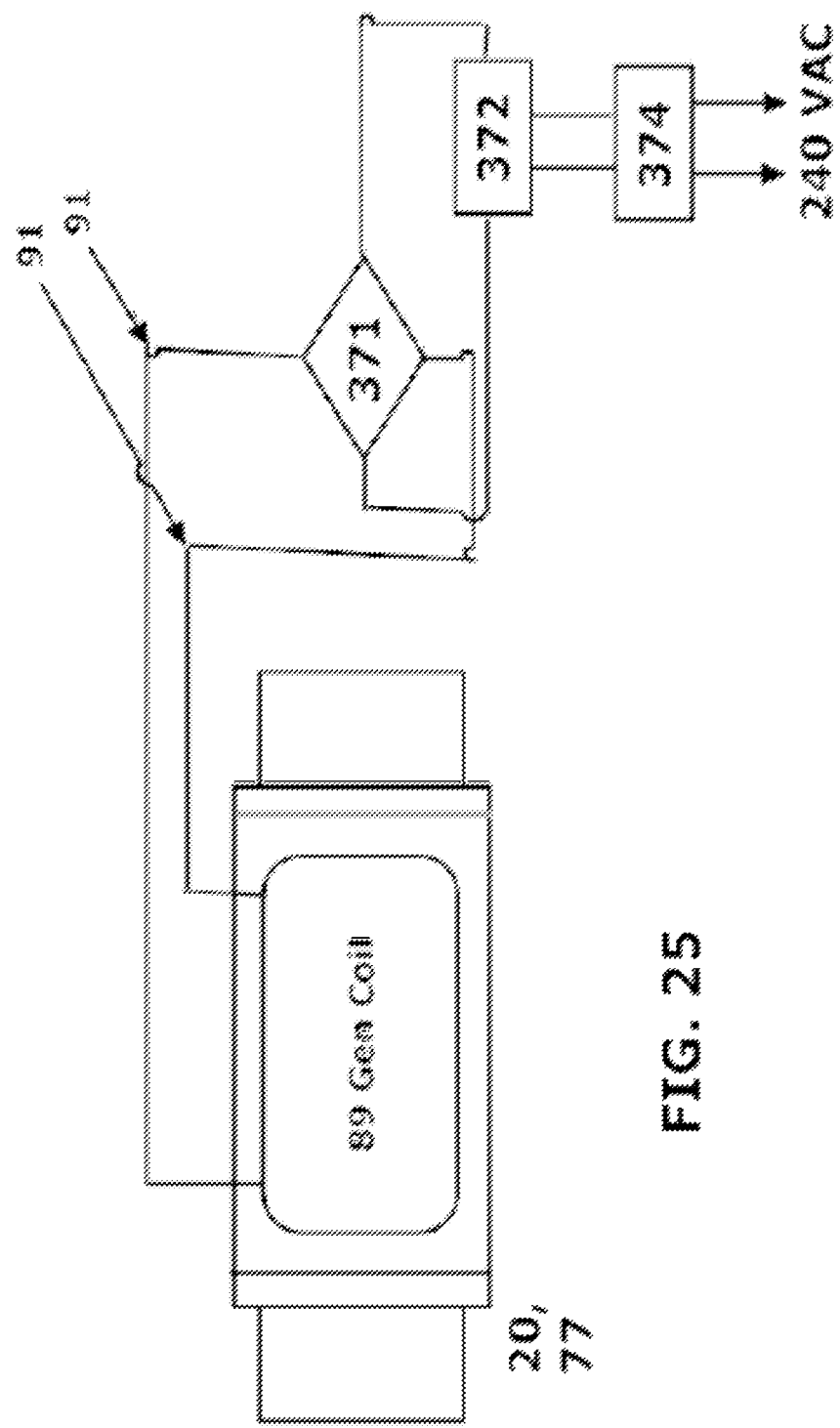
FIG. 25 is a schematic diagram showing the wiring detail of the radial engine of FIG. 1.

FIG. 25 is a schematic diagram showing the wiring detail of the radial engine of FIG. 1 with lead wires 91 from a generator 20 coil to a full bridge rectifier 371, a super capacitor 372, and a grid-tie inverter 374.

FIG. 26 is a functional block diagram showing the wiring diagram of a motor control board 430 with MosFet Power Transistors 411, 412, 413, and 414 for the four motor coils, a microchip 420; a transformer from a 24V input power to 12 VDC 422; a serial I2C input buffer 424; a dual input buffer 426; and diodes 401, 402, 403, and 404. This motor control board is similar to that depicted in FIG. 21 except the recovered energy pulses from the motor coils are routed directly to an electrochemical cell, thus showing the versatility in capturing and re-using back EMF pulses.

Figure 22:
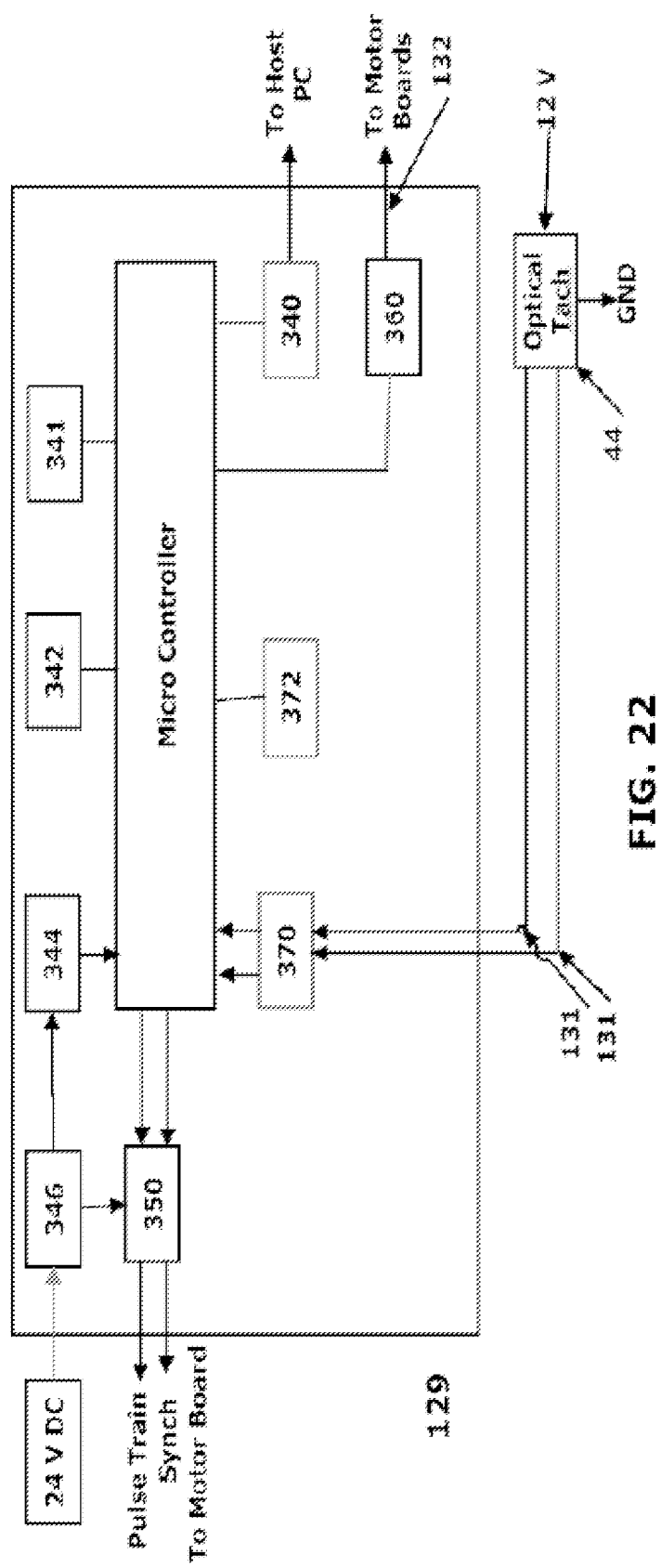
FIG. 22 is a functional block diagram of the radial array master controller of the radial engine of FIG. 1.

FIG. 22 is a functional block diagram of the radial array master controller 129 that shows tachometer-encoder 44 signals buffered via 350, and serial 2-wire communications bus wiring 132 buffered 360 between the master controller and individual motor control boards 130, 430. The master controller as presented in FIG. 22 is connected 360 to each motor control board in one exemplary design via 2-wire Serial (I2C) Protocol 132 as each motor control board has its own local microchip (or equivalent) microcomputer used to provide local control functions. In this example, the master controller 129 also includes an RS232 interface 340 to a host computer; power converter from a 24V input power to 12 VDC 346 and to 5VDC 344; an ICDU 342 Download and Debug Interface; an LCD Driver 341; an Input Buffer 370; and an Output Buffer 372.

In this example, local control includes Pulse Width Modulation (PMW) software for controlling motor coil 58 pulse period and duty cycle, digital inputs for receiving motor speed and crank shaft position data from the master controller 129, and software for handling I2C-based communications with the master controller 129. Such distribution of control and utility functions off-loads much of the time-intensive activities otherwise performed by the master controller 129, thus freeing up valuable computing resources. In this example, harvesting back EMF pulses from motor coils 58 is handled on the motor control board 130 on an individual board basis using a super capacitor under local microcomputer control. Local control eliminates excess and noisy cables, reduces otherwise excess terminations, and improves speed and accuracy of response, especially at higher motor speeds. Energy recovery is enhanced by trapping the highly energetic back EMF pulses at their source. This recovery takes advantage of the energy amplification produced by the intense, local magnetic fields associated with the Neodymium magnet stack 68 and its interactions with the motor canisters 51 when the motor coils 58 switch off. This back EMF enhancement is a major benefit of using iron-based magnetic flux path components.

The intense back EMF pulses as enhanced by the electromagnetics contain a rich spectrum of harmonics that, as shown in FIG. 26, can be returned to an electrochemical cell. In one example, an electrochemical cell is used to produce a Brown's fuel gas from water in a process which is a form of pulsed electrolysis. Brown's gas production is just one example of using the back EMF pulses where the RPM of the engine is tuned to the resonance requirements of the electrochemical cell or other use.

The tachometer-encoder signals 131 come to the master control board 129 from a tachometer-optical shaft encoder 44 as mounted atop the upper crank case 34 bearing block 40. Retransmitted tachometer-encoder signals are used by each motor control board 130 (or 430) as received from the master controller 129 to determine crank shaft 3 position and speed so as to coordinate local motor coil 58 pulsing and energy recovery packet transfers out.

Pulse Control

In other embodiments, a stack of a plurality of magnets is positioned within a split outer flux containment shell for applications with shorter or longer strokes. By applying repetitive, short pulses to the coils and by placing the coils at strategic positions along the axis of the tube, the direction, speed, and power of the magnet stack, which acts as a piston, are controlled. It is as if the magnet stack is surfing on rivers of magnetic flux.

Magnet Stack Levitation

An added benefit in overall motor 19 performance is provided by the strong magnetic interaction between the magnet stack 68 and the motor canisters 51 in that the radial forces of attraction are symmetrical along the axis of the motor canisters 51 and enclosed magnet stack 68. The net effect is that the magnet stack 68 is levitated and centered in the motor 19 structure. This levitation significantly lowers the mechanical load and friction in the motor 19. Additional component details on the magnet stack 68 are presented in FIGS. 9 and 10. Details on magnet stack attachment to the drive train 2 are presented in FIGS. 17 and 18. End caps 72 and 74 are made of aluminum, and the center shaft 71 may be fabricated from a 300 series grade of non-ferritic stainless steel, which is different than 430 F ferritic stainless steel. Motor canisters 51 and end caps 53 are made from a highly-permeable magnetic alloy.

Link Rod Pivot Connection

FIG. 17 presents a typical pivot connection between a link rod 12 and the clevis-style end caps 74, 101 and 114 used by motor magnet stacks 68 and generator armatures 97 and 106 as part of the extended drive train 2, where the pivot motion is facilitated by a bronze bearing insert 16 that holds a link rod drive pin 14.

FIG. 18 presents an exploded view of the components presented in FIG. 17 that form a typical pivot connection such that otherwise hidden features are better exposed.

DETAILED DESCRIPTION

Generators

In this embodiment, six reciprocating motors match the stroke and mechanical requirements of a radial engine; and a further objective of driving electrical generators in a radial configuration was achieved by adapting the electromagnetic principles developed in the magnetic motor above, to the generator's requirements. Two variations of armature magnet are described.

In one approach, a radially-polarized Neodymium ring magnet is used in a reciprocating armature. In another approach, two Neodymium magnets are arranged with like poles facing one another in very close proximity and used in a reciprocating armature.

In each case, the mono-polar magnetic flux from the armature assembly excites and induces current in an electrically-conductive, thinly-insulated metal coil as wound around the outer surface of a hollow, non-electrically conductive cylinder of sufficient diameter and length to house the reciprocating armature. The assembly of generator coil, radially-polarized magnet(s), and armature, much like the motor, is enclosed in a ferrous metal cylinder assembly. Said assembly is so structured and extended along the axis of movement so as to provide a path for magnetic flux from the magnet(s) to pass directly through the coil into the external shell, along and through the shell extensions, jump the very small radial gap of the armature containment tube, and thus be returned to the magnet(s) through the ferrous metal derived magnetic body of the armature, thereby completing the magnetic circuit. Because the motor and generator are mechanically tightly coupled, the stroke of the motor dictates the stroke of the generator armature.

Radial Polarization

To further emphasize the importance of the type of magnetization of the Neodymium ring magnet used in this generator alternative, it is instructive to compare it with the cylindrical Neodymium magnets used in the motor, or as used in the alternative of like poles in opposition just discussed for the armature. Motor magnets are axially polarized—that is, one end of the cylinder is North, the opposite end is South. The generator magnet is radially polarized—that is, the outside surface of the ring is North, and the inside surface is South. In one example, the ring, because of technical limitations on controlling magnetization, is a set of four, 90 degree radial segments placed end-to-end around the periphery of the armature with each segment polarized North-facing out. Such mono-polar orientation ensures that maximum flux is swept across and through the entire coil with each stroke, both back and forth. It is further instructive to note that some generators could be equipped with South-polarized ring magnets or, in the case of like poles facing one another, a cylindrical South could face a cylindrical South. Energy from a properly-configured set of generators that feature both North-polarized and South-polarized armatures and combined in the right pairings as to mechanical phase would provide considerable flexibility in addressing poly-phase electrical generating requirements. This inherent flexibility is of significant benefit. For example, consider load matching and load distribution—that is, the individual generator outputs are separate entities. Those outputs can be individually isolated and/or combined in isolation transformers that are single phase or poly-phase, depending on the intended load. This capability facilitates a simple and secure single distribution cable to the intended load local to the installation. Thus, a single failure in the field does not crater the entire system. The home or office of the future could be wired to accept both AC and DC power with separate and secure feeds provided to power the best load technology—AC in some instances, DC in others thus giving both the designer and the consumer their rightful freedom of choice.

Generator Assembly

FIG. 11 presents a half-sectioned (A-A) view of a generator 20 assembly comprising an iron-like generator canister 77 with threaded mounting holes 79 that match with end cap 80 mounting holes 82 and machine screws 83 to form a canister cavity 78 that houses a generator coil 89 with lead wires 91 that pass through entry holes 92 into the generator cavity 78. The coil center hole 90 is extended by the end cap center holes 81, the center holes 94 of coil spacers 93, and the center holes 88 of flux path extension rings 84.

There is one such ring at each end cap 80, and mounted to the end caps 74 with threaded mounting holes 80 that match end cap mounting holes 85 and accept mounting screws 87. An open center pathway is thus produced that houses a cylindrical armature center guide 95 of specific center hole 96 size to facilitate axial armature 97 movement.

Figure 12:
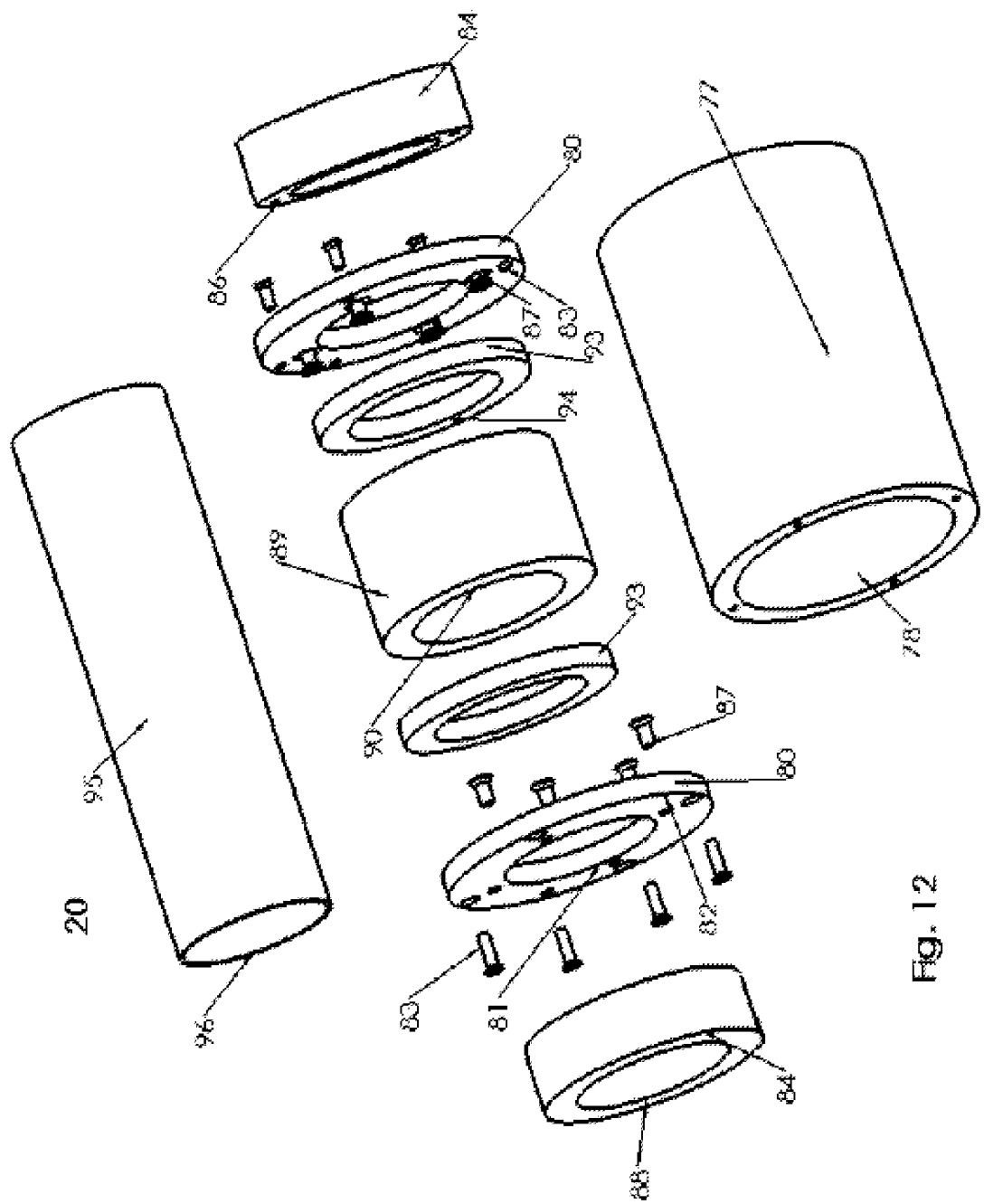
FIG. 12 is an exploded view of generator components in a first embodiment of a generator in the radial engine of FIG. 1.

FIG. 12 presents an exploded view of the electro-magnetic generator components presented in FIG. 11.

Generator Coil

In this embodiment, much like the motor coils 58, the generator coil 89 is a free-standing coil that needs no bobbin for support. In an exemplary variation, the coil has 1000 turns of 20 AWG wire nearly 420 ft long and is housed inside a generator canister 77 that is nearly identical to a motor canister 51 both in form and function. That is, the generator canister 77, its end caps 80 and associated flux return extension rings 84 together provide a magnetic flux return pathway to the armatures 97 or 106. The strong magnetic field of the armature 97 or 106 interacts with the canister 77 and other flux-related components such that radial magnetic forces come into balance along the axis of the armature. These radial forces tend to automatically center and levitate the armature inside the generator center guide 95 and thus reduce friction.

Generator Coil Lead Wires 91 have been truncated in most of the generator figures to minimize visual interference. FIG. 25 presents a functional wiring diagram of a generator 20 complete with wire entry portal 92, rectifier 133, and super-capacitor 134. In many applications, rectifiers and filters are used to convert raw Alternating Current (AC) into Direct Current (DC) and the DC is further converted, with some losses, back into conventional AC in terms of voltage and at standard frequency—for example, 120 Volts AC at 60 Hertz. However, such dual conversions are not always necessary or desired. In the future, it might be very desirable to send the raw AC as produced embodiments as discussed herein to a remotely located electrical load and perform voltage and frequency conversions as necessary at the load site. If those loads are resistive in nature, such as lights and heaters, then no conversions are necessary, thus saving costly conversion expenses. A further benefit is that individual electrical loads can be isolated on a dedicated supply so that a failure at or in the load does not affect other loads nearby. The descriptions above demonstrate the flexibility and versatility of an array of linear generators.

Armature

Figure 13:
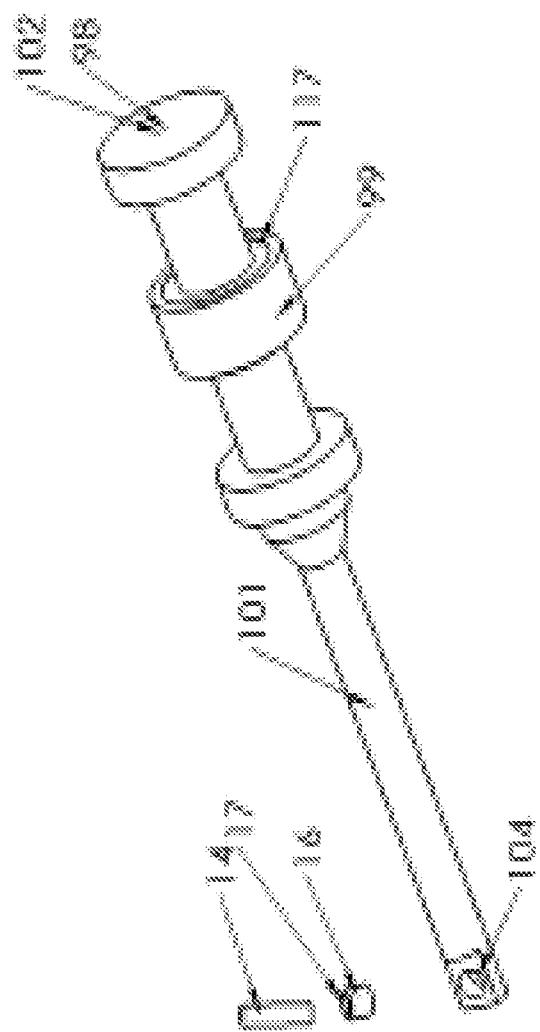
FIG. 13 is a side perspective view of a first embodiment of a generator armature for a generator in the radial engine of FIG. 1.

As shown in FIGS. 13 and 14, a first armature 97 version features a radially-polarized ring magnet 99 fixed to a spool piece pedestal 117. In this example, the outward facing surface is polarized North. This magnet pours a constant stream of magnetic flux over the entire circumference of the generator coil 89 as the armature 97 sweeps back and forth in synch with the magnetic motor(s). Electrical generation stops only momentarily as the sweep is reversed at the end of the motor stroke. This gives remarkable Generator 20 performance.

FIG. 13 presents a first embodiment of a generator armature 97 assembly comprising a cylindrical spool piece 98 with threaded holes 100 at the end flanges, where the center pedestal 117 of the spool piece 98 holds four 90-degree segments that form a generator radial magnet 99 and one end of the spool piece 98 is affixed to a short, threaded connection rod 103 that mates with a threaded hole 102 in the upper end of a clevis-like connection cylinder 101 that has a clevis-like mounting hole 104 at its lower end to receive a bronze bearing insert 16 with its center hole 17 that accepts a link rod clevis-like drive pin 14. FIG. 14 presents an exploded view of the components presented in FIG. 13 that form a Generator Armature 97. A central cavity 118 is provided in the assembly of four 90 degree Neodymium magnet arc segments that form a generator armature radially-polarized ring Magnet.

Figure 23:
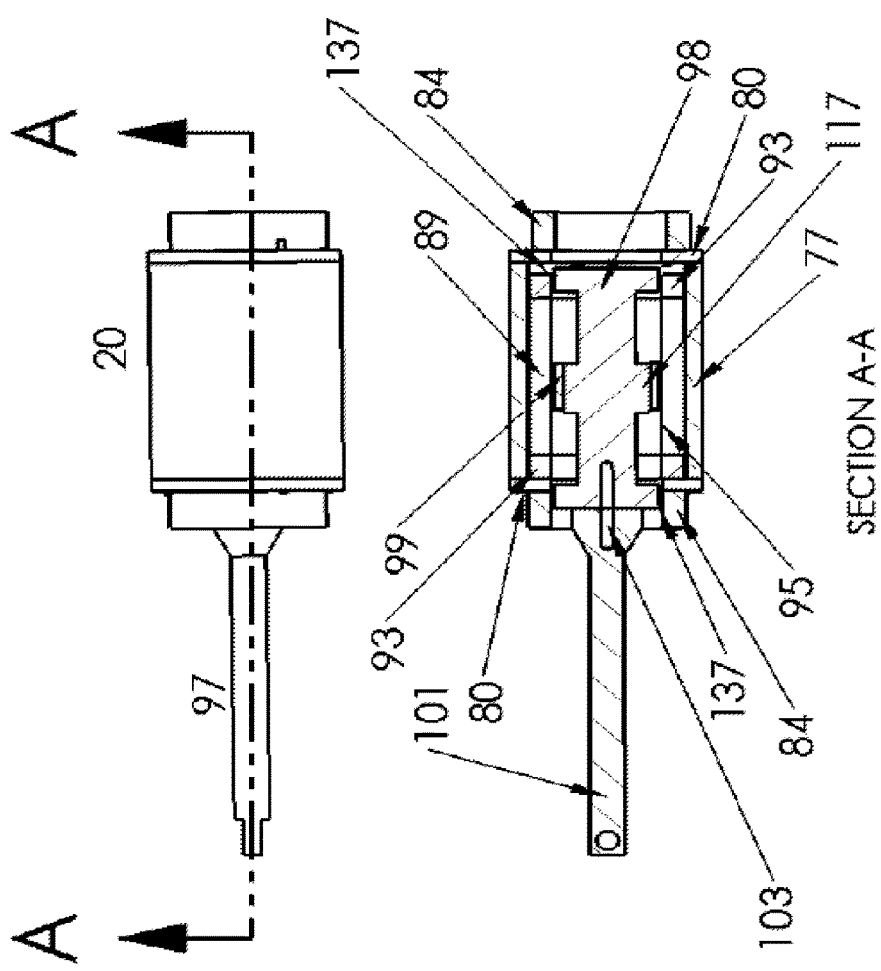
FIG. 23 is a front sectional view of a generator with the armature of FIG. 13.

FIG. 23 is a front sectional view of a generator 20 complete with armature 97 that shows the flux return path continuity 137.

Super-Pole Armature

Figure 16:
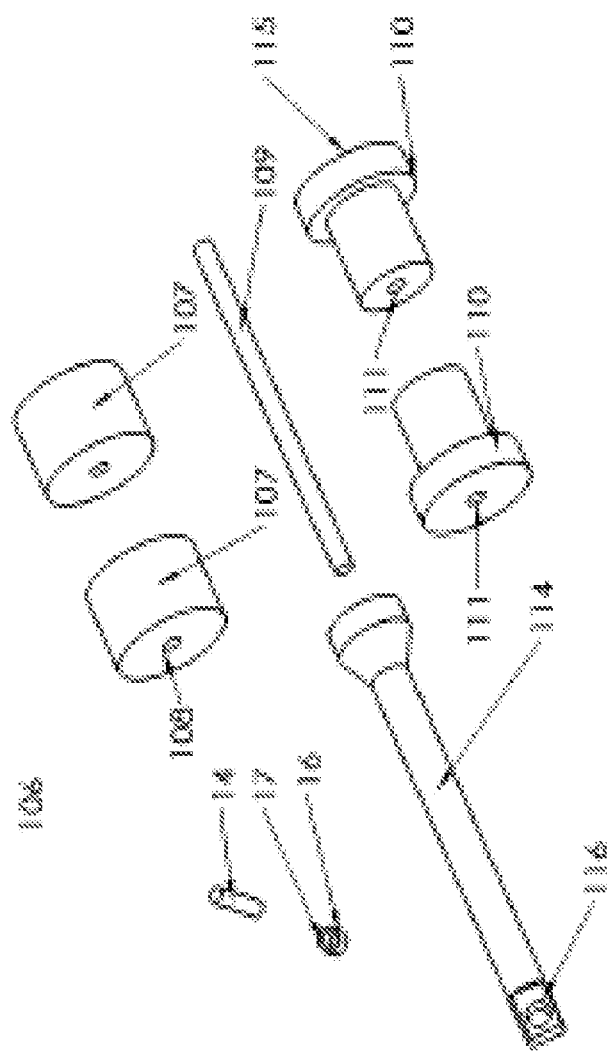
FIG. 16 is an exploded view of generator components in a second super-pole-based embodiment of a generator in the radial engine of FIG. 1.

Similar performance claims can be made for a second version of an armature 106, even though the magnetic mechanism is quite different. As shown in FIGS. 15 and 16, armature 106 features a pair of Neodymium magnets 107 mounted on a center shaft 109 with like poles facing one another in opposition.

FIG. 15 presents a super-pole-based embodiment of a generator armature assembly 106 where a pair of Neodymium magnets 107 with center mounting holes 108 are mounted North facing North on a threaded center shaft 109 where the magnets 107 are flanked by flux path extension rings 110 with center mounting holes 111. The assembly is capped on one end by a cylindrical cap 112 with a threaded center hole 113 that attaches to the center shaft 109. In a like fashion, the other end of the assembly is capped by a clevis-like cylindrical cap 114 with a threaded mounting hole 115 on the upper end that attaches to the threaded shaft 109 and provides a clevis-like mounting hole 116 on its lower end that receives a bronze bearing insert 16 with center hole 17 that accepts a link rod clevis-like connecting pin 14.

FIG. 16 presents an exploded view of the components presented in FIG. 15 that form a Generator Armature 106.

Because these magnets have a rotational component in the magnetic flux vector, on first glance it would appear that no power could be generated by such a configuration because the rotational components as swept along the generator coil 89 would cancel one another due to opposing moments of magnetic rotation. However, a very strong scalar (non-rotational) magnetic wave appears that generates electrical power very efficiently as it is swept along the surface of the generator coil 89. As in the first armature 97, provisions are made in the super-pole version to extend the flux return paths along the axis of the magnets to ensure the continuity 137 of the magnetic flux return function. An end-of-stroke condition (as stated above) is shown in FIG. 24.

Figure 24:
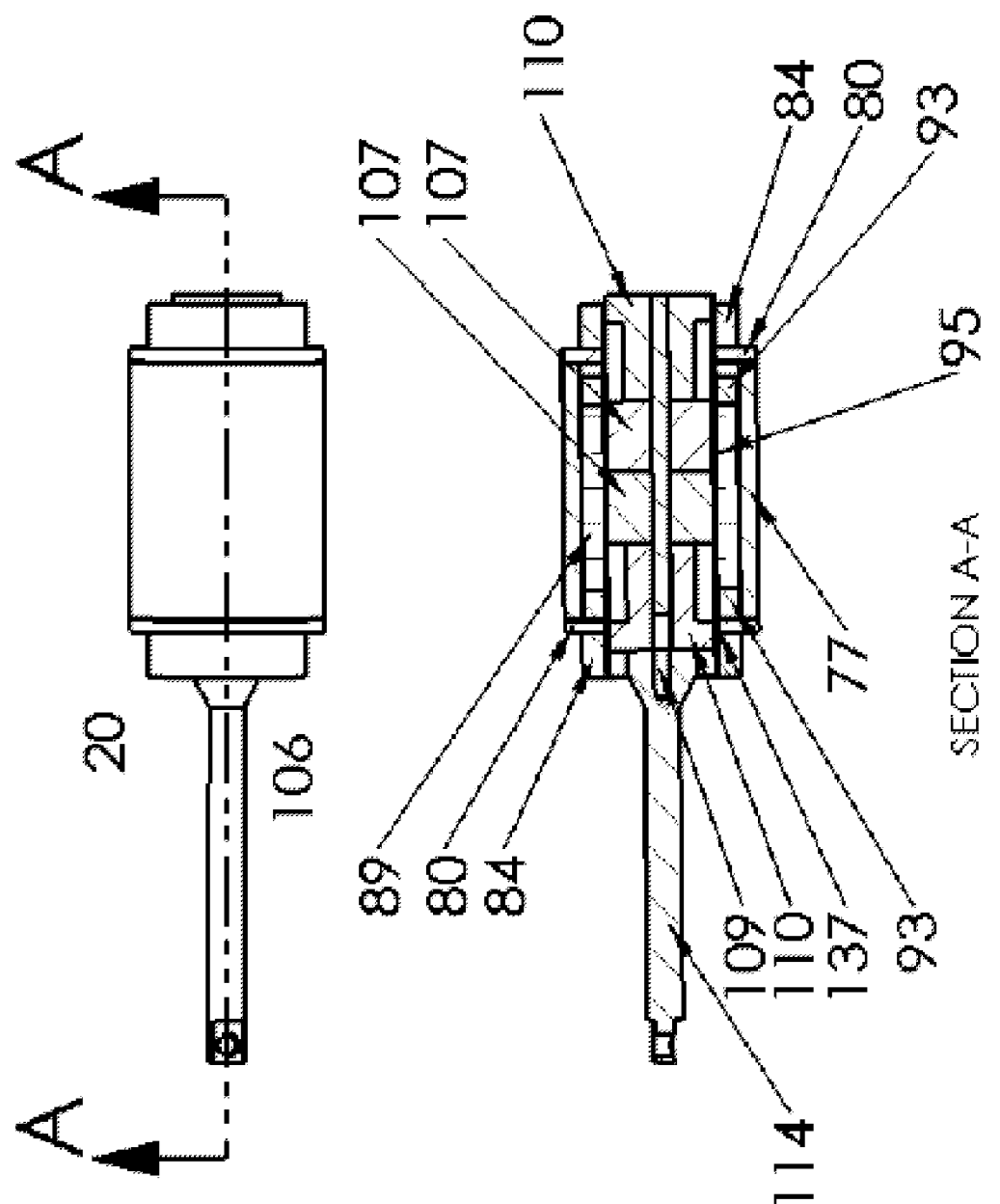
FIG. 24 is a front sectional view of a generator with the armature of FIG. 15.

FIG. 24 is a front sectional view of another embodiment of a generator 20 complete with armature 106 that shows the flux return path continuity 137.

Flux Extensions

In both armatures 97 and 106, the flux extensions provide at least two functions. First, flux path continuity 137 is always maintained so magnetic "lock", which really means flux continuity, is never broken. Second, there is sufficient distance between the edges of the armature magnets 99 and 107 and the flux return components, together with balanced forces due to radial magnetic symmetry, to prevent magnet-to-flux component lock-up, that dreaded condition that stops all motion.

Radial Arrays

One or more radial arrays of magnetic motors 19 may drive one or more similar arrays of linear generators arranged in a radial configuration to produce electrical power. In the example of FIG. 1, an array of six magnetic motors 19 provides excitation to a similar array of six generators 20. FIGS. 11 and 12 show the assembly and components for generator 20 design. Unlike conventional rotary generators where the rotor breaks the magnetic flux path with the stator repetitively with significant energy loss, the example linear generator presented herein is designed so as to never break the magnetic flux between the armature and the generator stator. Because the generator stroke is known to be equal to the magnetic motor stroke, we add magnetic Flux Return Rings 84 to the Generator End Caps 81 so as to maintain intimate proximity to the magnetic flux extensions 98, 110 of the armatures 97, 106 as the armatures move back and forth in synch with the magnet stacks 68 of the magnetic motors 19. These end-of-stroke relationships 137 are presented graphically in FIGS. 23 and 24 for the two armatures 97, 106, respectively. Otherwise, most of the generator 20 body somewhat resembles the structure of the magnetic motor 19 canister 51—however, the generator canister 77 houses a much larger, single coil 89.

DETAILED DESCRIPTION

Energy Recovery with Combinations of Motors and Generators

Regenerative Energy Harvesting

With the radial engine and its associated controller, sufficient structure exists to pursue regenerative energy harvesting. The motor control computer is programmed to control motor coil pulsing so as to minimize 'hot' current. This pulsing reduces heat and wasted energy. Pulse control creates field effects and field interactions that help 'move' the magnet stack pistons. During the pulsing, significant voltage transients are produced—especially when coils are de-energized. Unlike most conventional systems, the radial engine control system is designed to harvest such pulses and to use the harvested pulses to re-energize other parts of the overall system such as standby batteries, capacitors, and/or electrochemical cells that produce fuel gas and other useful materials.

Pulse transient harvesting and redirection is facilitated, in major part, by the electromagnetic performance of the motor canisters. That is, magnetic coupling between the Neodymium magnet stacks and the motor canister or container causes the magnet stacks to center themselves and partially levitate thus significantly reducing friction encountered in conventional systems. Voltage spikes produced by coil field collapse in such a strong magnetic environment are strengthened. Such pulses are shunted away from the source coils to capacitor banks, batteries or a combination of batteries and capacitors so as to augment overall system power. In the situation where renewable energy like solar, either stand alone or in combination with batteries, is the power source for the radial engine, such voltage spike harvesting using super-capacitors under computer control can produce significant overall improvements in efficiency, cost reduction, and life-cycle cost compared to existing technology. The very low equivalent series resistance (ESR) of a super capacitor in combination with the electromagnetic pumping action of the motor structure during coil field collapse can return significant energy to the overall radial engine system.

By measuring and tracking the voltage drop across one or more super-capacitors as placed to strategic advantage in the overall radial system, the computers can make decisions about how best to export the energy so as to maximize total system utility. Exemplary of those decisions would be, for a few rotations of the engine, for the control electronics to shut off all power pulses and rely on the flywheel effect to carry the engine. During that short interlude, super-capacitors could safely and in a controlled fashion dump their accumulated charge to external loads or to front-end supply for utilizing the harvested energy in near real time allowing the flywheel to sustain the power to the system. Using novel switching schemes these events could happen in millisecond intervals.

Control System

With a radial engine in hand, it becomes possible to implement its control system. So as to capture the potential power density of the engine and exploit the engine's various features, a microcomputer is used as the central controller with satellite microcomputers distributed among the motors. A pulse-width-modulated (PWM) signal is derived from the control computer's crystal clock. PWM is gated under computer control to energize motor coils with precise timing. Pulse parameters such as period and duty cycle together with drive shaft position are used by the control software to regulate the power and relative motion of each electromagnetic reciprocating motor. The computers receive pulses from an encoder attached to the main shaft. A pulse from the encoder, in an exemplary system, is an external interrupt that triggers the execution of an interrupt service routine (ISR) in the computer's control software. Other schemes for timing may be used as well. Part of the ISR is code for a digital comparator that counts pulses and thus tracks rotor position. Rotor speed is also derived by timing a second, independent rotor pulse against a hi-speed time base generator. Based on cross-checked rotor position, the computers are programmed to apply specific amounts of power to the individual motor coils. How much power and when to fire for a specific set of coils are based on the magnet stack's relative position in the overall cycle. In one example, all of the motor coils receive PWM pulses at all times except for when a magnet stack is at the end of travel which is designated for convenience as "top dead center" or "TDC" when the magnet stack is closest to the crank shaft 3, and "bottom dead center" or "BDC" when the magnet stack is furthest from the crank shaft 3. End-of-travel is fixed based on the length of stroke. A short recess in power pulses occurs at end-of-stroke to minimize unwanted compressive mechanical stress that might otherwise occur. Furthermore, a short 'time-out' as the linkage (approaching Top Dead Center) makes its turn conserves supply energy in that the torque angle is very shallow.

Materials

Strong magnetic fields associated with the motors and Generators typically require the use of non-magnetic materials such as stainless steel and aluminum (or their equivalent) in most of the mechanical support structures. Generally accepted machine tool practices can accurately produce the parts necessary from such metals and similar materials to construct such a machine.

DETAILED DESCRIPTION

Radial Arrays of Motors and Generators

An enhanced motor and generator combination makes it feasible to create a totally electro-magnetically driven, radially-derived, motor-generator system.

In this embodiment, a radial engine systems approach is presented to take advantage of and leverage the improved electro-magnetic linear reciprocating motors and generators as combined in radial arrays to produce electrical energy and do so by now taking advantage of superior, radial engine topology. Furthermore, the power density represented by several simultaneously-active motor coil sets, in combination with intense magnetic flux circulating in the motor canisters provides a rich harvest of highly-intense, back-EMF pulses for uses such as charging stand-by batteries and for pulse electrolysis in certain electrochemical cells.

However, those skilled in the art will understand that this does not preclude the use of any of the components such as the linear elements, the motor, the generator, or combinations of motors and generators, either stand alone or in groups, using either a radial or linear topology to produce benefits according to the principles of operation as described.

In order to understand the particular design intent and approach taken on the electromagnetic elements of said embodiments, it is useful and informative to consider what is most limiting, first in terms of mechanics and then in terms of magnetics because the mechanics has a profound impact on the magnetics. The radial concept facilitates the presence of multiple active elements joined together in a common plane of rotation. The joining of drive forces in a common plane provides enhanced performance, stability, reliability, and scalability. Similar advantages can be obtained by balancing loads in a separate plane(s) of rotation and then attaching the rotational plane(s) to a common crankshaft.

If the drive forces are electromagnetic and the loads are electromagnetic, then the radial mechanics can be leveraged even further. By employing electro-magnetics, it is possible to eliminate most of the elements otherwise associated with internal combustion engines and thus vastly simplify an already superior radial engine concept. In this embodiment, a radial array of magnetic motors 19 drive an array of magnetic generators 20, and do so by employing Neodymium permanent magnets 68, 69, 99 in the presence of significant iron-containing structures 51, 77, a combination deemed unlikely or "impossible" by many in the literature. Locking the radial array stroke to the linear, electro-magnetic, reciprocating motor stroke permits combining NIB magnets and ferro-magnetic materials.

FIG. 1 is an example "Radial Array" where six sets of magnetic motors 19 are mounted in tandem 18 with companion generators 20.

Figure 3:
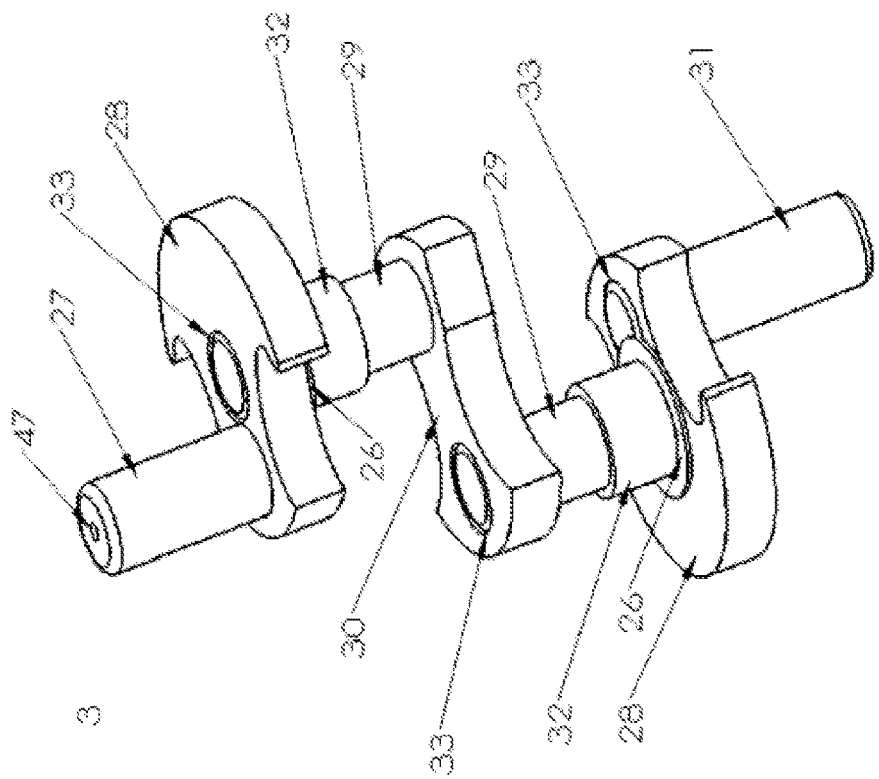
FIG. 3 is an oblique view of the crank shaft of the radial engine of FIG. 1.
Figure 2:
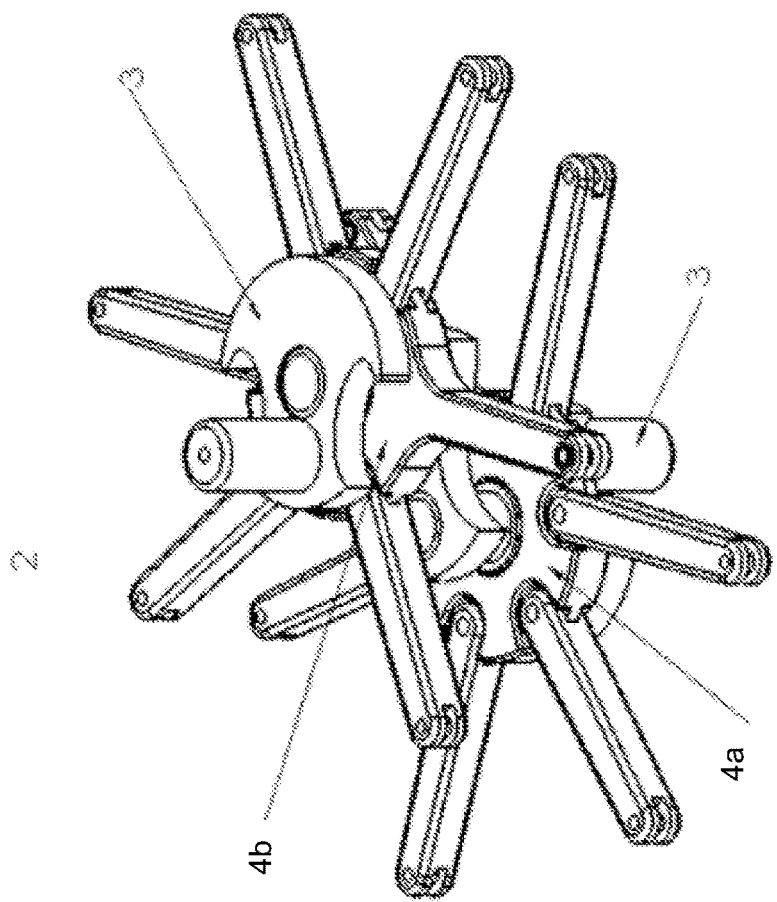
FIG. 2 is an oblique view of the central drive structure of the radial engine of FIG. 1.

The motors and generators are connected to a drive train 2 as shown in FIG. 2. In this example, the drive train 2 is comprised of two drive rod arrays 4a and 4b mounted on a central support crank shaft assembly 3 where the lower drive rod array 4a is for motors 19 and the upper drive rod array 4b is for generators 20. More detail on how the crank shaft 3 is assembled is shown in FIG. 3 and how it is mounted inside a crank case 34 is shown in FIG. 6. Details of tandem 18 mounting are given in FIG. 5 as discussed below.

FIG. 1 is an angular relief view of an entire radial engine 1 that combines two arrays 4a and 4b of electromagnetic elements working in tandem. In this example, the bottom array 4a is for motors 19 with integral magnet stacks 68 and the top array 4b is for generators 20 with integral armatures 97 mounted in tandem 18 and attached to a base structure 25 that also supports a crank case 34. A top plate 35 supports a top-most bearing block 40 connected to a tachometer-encoder 44.

Central Drive Structure

FIG. 2 is an oblique view of the central drive structure 2 extracted from FIG. 1, showing the system crankshaft 3 that supports drive rod arrays 4.

FIG. 3 is an oblique view of the crank shaft 3, without the radial drive rod arrays 4a and 4b. The crank shaft comprises an upper drive shaft section 27 with tachometer-encoder attachment hole 47. The upper drive cam 28 is equipped with two mounting holes 33 that, in turn, is connected to a first drive stud 29 that is connected to a two-holed 33 central drive coupler 30 that further attaches to a second drive stud 29 as attached to a two-holed 33 lower drive cam 28 and on to a bottom drive shaft section 31, where the drive studs 29 each provide axial support for an annular crank shaft bearing 32 that support the above-mentioned radial drive rod arrays 4. (Note: the aforementioned connections are pressed fit with optional holes for tapered pins not shown here).

FIG. 4 is a top view of a drive rod array 4 that shows a master rod 5 with its center hole 6 and a group of five pairs of countersinks 7 with connection holes 8 that accept embedded bronze 16 or needle bearings 9 with center holes 10 to support the five clevis-style link rods 12 as affixed with master rod drive pins 11 so as to provide drive connections to motors 19 and generators 20, such connections facilitated by clevis-style drive slots 13 and connecting holes 15 in the link rods 12 that accept link rod drive pins 14 that mate with the center holes 17 of bronze bearing inserts 16.

FIG. 5 is an oblique view of a tandem assembly 18 comprising a motor 19 and its companion generator 20 with motor mount holes 21, generator mount holes 22, complete with tandem mounting holes 23 that accept cylindrical pins 24 that affix the tandem assembly 18 to a hex base support structure 25 as shown in FIG. 1 that attaches to the engine 1 assembly via mounting holes 23 and cylindrical pins 24. A base plate center hole 120 provides an aperture for the bottom crank shaft bearing block.

FIG. 6A is a top view of a crank case for the radial engine of FIG. 1. FIG. 6B is a half-sectioned (A-A) view of a slotted-wall 49 crank case 34) with a top 35 and bottom face plate 36, such plates attached to support studs 50 via mounting holes 38 and machine screws 39, where both top 35 and bottom 36 plates secure a bearing block 40 that holds a crank shaft bearing 32 with its access hole 37 concentric with the bearing block access holes 42 that accept crank shaft 3 end sections 27 and 31, and each bearing block 40 provides mounting holes 41 that accept machine screws 39 for crank case 34 assembly, and additional mounting holes 43 on the top surface to mount a tachometer-encoder 44 with socket head cap screws 45 where the tachometer rotor stud 46 attaches to the upper drive shaft 27 mounting hole 47 via socket head cap screw 48.

The crank shaft 3 design provides sufficient axial separation of the lower crank 3 that is driven by the motorized 19 plane of rotation from the upper crank 3 that drives the generator 20 plane of rotation. This separation distance includes the center-to-center distance of the drive rod arrays 4, crank shaft shim 26 thickness, and room for sufficient structural metal to support the motor canister 51 and the generator canister 77 mounted above. This distance is also impacted by half the sum of the respective canister 51,77 diameters and thus affects the casement 34 slot locations 49 to accommodate and position the drive train 2.

Mounting

In this example, the mounting of motors 19 and generators 20 is shown in FIG. 5 where a tandem 18 cradle assembly is shown based on the aforementioned distance considerations. The tandem assembly shows a generator 20 complete with armature 97 locked into the upper tandem 18 frame by the flux extension rings 84 that are attached after the generator canister 77 is placed inside the tandem 18 frame during assembly. A motor 19 complete with magnet stack 68 is shown positioned in the lower tandem cradle position and is held in place by conventional clamp rings from commercial sources (not shown). FIG. 5 shows the tandem 18 attached to a hex base support structure 25 using large pins 24 much like pins used in mounting large optical elements where positioning accuracy and strength are of paramount importance. The crank case 34 is also attached to the hex base 25 using heavy pins 24.

In this example, the stroke of the magnetic motor 19 is established and fixed by the diameter of the circle of crank shaft 3 cam 28 rotation as depicted in FIG. 3.

The lower cam 28 in FIG. 3 anchors a crank shaft stud 29 that holds a crank shaft bearing 32 and these provide support for a drive rod array 4. The lower cam 28 is also attached to a section of crank shaft 31 that is anchored in another bearing 32 as mounted inside a bearing block 40 affixed to the crank case bottom plate 36 as shown in FIG. 6 and this establishes the center of crank shaft rotation. It can be seen in FIG. 3 that the center of the lower crank shaft stud 29 is offset some distance from the center of the lower crank shaft section 31. The "crank" thus formed between elements 29 and 31 reacts to the external forces that magnetic motors 19 impose on the drive rod array 4 as those forces cause the center hole 6 of the drive rod array to move which causes the "crank" to rotate inside the aforementioned bearings. As the "crank" is turned through a complete 360 degrees, all of the link rods 12 and magnet stacks 68 attached thereto move a total distance (inwards towards the center of rotation and outwards away from the center of rotation) of twice the aforementioned offset. Twice the offset is the stroke of the engine and is the distance that any magnet stack 68 moves to and fro within the confines of its magnetic motor 19 housing 51.

The engine stroke affects the motion of the generator 20 armatures 97 in a manner analogous to the motion described above. As shown in FIG. 3, the lower crank shaft stud 29 connects to a central shaft coupler 30 and on to an upper crank shaft stud 29 where the coupler 30 offset is twice that of the lower section. Thus, the upper crank shaft stud 29 has the same magnitude of offset from rotational center as the lower crank shaft stud 29 but is 180 degrees out of phase with the lower section. The upper crank shaft stud 29 combines with a crank shaft bearing 32 to support a second drive rod array 4 that connects further to the generator 20 armatures 97. Support of the entire crank shaft assembly 3 is completed where an upper crank shaft section 27 as connected to the upper crank shaft stud 29 via upper cam 28 is socketed in a final crank shaft bearing 32 mounted inside an upper bearing block 40 that is affixed to a crank case 34 top face plate 35 as shown in FIG. 6. Overall crank shaft motion initiated by the motor 19 array 4 is thus coupled to and drives the generator 20 array 4 and the stroke of an armature 97 thus matches the stroke of a magnet stack 68.

In this example, the entire crank shaft 3 structure as presented in FIG. 3 is a solid structure where the non-magnetic metal components are press-fit using conventional heating of the female parts and cooling of the male parts and joined or may be sealed at the joints with a compound such as Loctite™ or, alternatively, those elements so joined are drilled at the joints and are reinforced with taper pins, a method familiar to those skilled in the art.

Radial Configuration and "Proper Pairing"

With reciprocating motor and generator in hand, it becomes possible to construct an engine made up of several such motors and/or generators aligned in layers centered on a common drive shaft. The radial, rotary crankshaft described herein, as applied to combining arrays of electromagnetic motors and generators on a single drive shaft, is an incredibly tough, resilient, and versatile mechanical device. By synchronizing their collective motion, the motors in an array will interact with one another and, with proper pairings, significantly enhance torque, efficiency, power, and overall reliability.

In one example, 'proper pairings' means an array of motors that is an even integer number where the motors are located directly opposite one another. If a motor in an array at 12:00 is switched on or off in tandem with a motor 180 degrees opposed at the 6:00 position, by sharing a common switch mechanism between the two motors, it is possible to double the instantaneous torque produced by a single motor and the contributions of torque are in mechanical phase. Electromagnetically, such 'pairing' is a significant advantage in increasing overall torque and power and uses fewer control circuits by cross-wiring the coil-activation signals. Such 'pairing' could likely not be accomplished with a radial internal combustion engine as the dynamics of the 4 stroke combustion cycle dictate the use of an odd integer number of cylinders.

A single motor failure has minimal effect on the performance of the disclosed array. Also, one experienced in the art can connect successive radial assemblies on a shared crankshaft, even connect one or more similarly-structured generator arrays on that common crankshaft, and even further, stack generators one on top another and link their armatures together with a non-magnetic connecting rod as driven by a common link rod back to the crankshaft and double the potential generation capacity in doing so. Thus, the radial array concept combines advantages in radial topology with the electromagnetic and electromechanical advantages of linear reciprocating elements resulting in an energy-producing system that is scalable, reliable, energy efficient, operates with fewer moving parts, and is non-polluting. Individual motors can act as brakes and, owing to its mass, an array acts as a flywheel that stores angular momentum thus smoothing out external changes in load in a self-regulating action most useful to help control the overall engine performance and RPM. In short, this systems approach is a significant improvement over any singular linear reciprocal motor or generator and promises energy density sufficient to power a vehicle, a home or, small business. The linear motor and generator stages all share common parts except for the internals of the magnetic canister that houses the generator coil and its magnetic armature. Furthermore, because all coils and magnet stacks are housed inside a magnetic canister, electromagnetic interference (EMI) is significantly reduced as compared to conventional switch-actuated devices that are not as well shielded.

There is only a single constraint on the movement of any magnet and that is the rod that connects it to the crankshaft. Otherwise, magnet stacks or rings are allowed to freely move within the confines of the tubes that encase them. Such relatively free movement within a defined space eliminates the special linkages that some other devices use to cushion or absorb the collisions that can occur at turn arounds of TDC at the pending downstroke, and BDC at the pending upstroke, especially if mechanical switches are used for timing as mechanical switches can lack timing accuracy. The motor controller tracks and cross-checks rotor position versus speed and interlocks power to the coils off if excessive deviation is detected.

As for control of a radial generator array, it too has an end-of-stroke issue because it is coupled and synchronized with the motors. At the end of stroke the velocity of the armature magnet is zero or close to zero so little or no power is generated. Therefore, end-of-stroke is an ideal time to pulse transfer accumulated energy from any generator rectifiers to any exterior power distribution circuits in a smooth and regulated fashion. Voltages are measured across any energy integrators such as batteries or capacitors by the controller and such measurements are used to coordinate generated energy export.

Example—Dimensions

In this example, it is desirable to create a geometric asymmetry between active, electromagnetic components in order to improve to the performance of the motor. A prototype engine has the following dimensions:
- magnet stack diameter—1 inch
- magnet stack length—4 inches
- magnet inside diameter—0.25 inches
- magnet stack stroke—2 inches
- magnet stack track inside diameter (ID)—1.010 inches
- magnet stack track outside diameter (OD)—1.10 inches
- magnet stack track cylindrical wall thickness—~0.045 inches
- magnet stack track overall length—~8.4 inches
- motor coil outside diameter—2.05 inches
- motor coil inside diameter—1.12 inches
- motor coil length—1.6 inches
- space between motor coil pairs—~0.4 inches
- flux return cylindrical shell OD—2.5 inches
- flux return cylindrical shell ID—2.06 inches
- flux return cylindrical shell wall thickness—0.22 inches
- flux return cylindrical shell length—3.8 inches
- flux return shell end cap OD—2.5 inches
- flux return shell end cap ID—1.12 inches
- flux return shell end cap thickness—0.22 inches In this example, there are two magnetic flux containment shells or canisters per linear motor, and the engine has three pairs of motors in juxtaposition located in a symmetrical radial pattern as centered on the master rod axis of wobble. The master rod does not rotate but its wobbly motion forces the crankshaft to rotate.

The inner plastic Delrin™ central tube is a pathway for the motion of the magnet stack. It is of sufficient overall length to act as an alignment/centering mechanism for aligning the 2 outer shells as part of the linear motor assembly.

A stack of four NIB 1 inch diameter, 1 inch long magnets forms the magnet stack or piston that moves back and forth inside the magnet track with a linear displacement of +/−1 inch. The above-mentioned geometries are such that the outer edges of the outer coils are placed in close proximity to the inside surfaces of the shell outer end caps. The shells with end caps share a common mounting on the magnetic stack track but remain separated magnetically by a non-magnetic spacer between them of ~0.2 inches. Thus, the outside surfaces of the inner coils are in close proximity to the inner surfaces of the shell inside end caps.

Magnet Spacers

ASTM A848 metal or other spacers may be provided between permanent magnets in order to adjust the total length of a magnet stack, and to conserve the amount of magnetic material in the magnet stacks. More advanced configurations of magnets and conductive materials is discussed below.

Example—Arrays of Magnetic Elements

In one embodiment, a Halbach array or other arrangement of magnets and high permeability material is used in the linear element magnet stack in order to amplify and focus magnetic field.

Motor Coil to Magnet Stack Asymmetrical Issues

In this example, the magnet stack is placed inside the magnet stack track and connected to the engine crank shaft such that the stroke of the engine as dictated by the design of the crank shaft places a fixed limit on movement of the magnet stack to 2.0 inches. This mechanical connection also, based on the geometries of the electromagnetic coils and magnets. forces two instances of asymmetry between the affected elements.

Bar Magnet Alignment—when either of the inside coils is energized, the coil tries to force the center of the magnet stack to align with the center of that coil. Complete alignment is prevented by the relative lengths of the elements in combination with the engine stroke override—in addition, the length of the magnet stack tends to keep the poles at its edges from trying to lock up with the inner end caps of the flux shells. In this example, radial symmetry is also helpful.

Polar Repulsion—As long as the outer edges of the magnet stack, the poles, are kept somewhat inside and away from the exact centers of the outside coils, whenever one of those coils is energized the resulting forces of magnetic pole and coil magnetic field repel one another. Again, the mechanical override enforced by the crankcase linkage to the magnet stack enforces the asymmetry between magnetic fields.

Suppliers

Magnetic Applications Metal per ASTM A848 was supplied in solid, cylindrical Sections of 2.5 and 2.75 inches diameter by CMI Industries. MWS Wire Industries supplied bifilar, 20 AWG specialty-coated copper magnet wire for self-supporting electrical coil applications in 11 pound spools. Cotronics Corporation supplied model 134 Ceramic-filled Grease for thermal management in electrical systems. TheissenKrupp Materials USA (OnLineMetals.com) supplied T7075 Aircraft Aluminum and 300 Series stainless steel in plates ⅜ inch thick to ¾ inch thick and rods 1 inch diameter. Caswell Industries supplied black oxide based corrosion management coatings and sealers as applied to protect ASTM A848 magnetic metal components. K&J Magnetics.com supplied N42-N52 grade Neodymium-Iron-Boron cylindrical ring magnets in nominal diameters of 1 to 1½ inches OD and ¼ to ⅜ inch ID, in typical axial thicknesses of ¼, ½, and 1 inch, and typically magnetized axially.m IGUS, gmbh supplied self-lubricating, pressed-fit plastic bearings in sizes ranging from 1.25 inch OD, 1.0 inch ID, 0.75 inch Axial Thickness to 0.25 inch OD, 0.188 inch ID, 0.25 inch Axial Thickness. McMaster Carr supplied Delrin™ polyacetal oversized plastic tubes 1.77 inches OD, 0.935 inches ID, and 12 inches in axial length used as machining blanks for making magnetic motor piston-like rotor raceways; and Lexan™ polycarbonate plastic tubes in sizes ranging from 2.75 inch OD by 2.5 inch ID to 2.5 inch OD by 2.0 inch ID in axial lengths nominally 12 inches—used as machining blanks to make coil cavity liners for linear motor and generator assemblies.

Alignment Issues

In practice, it is possible to make changes to the aforementioned dimensions provided the asymmetries discussed above are maintained. If it proves difficult to get magnets of a specific length to match up with different coil lengths, then it is possible to make small adjustments to magnet stack length by inserting appropriately-sized cylindrical washers made of ASTM A848 metal inside the junctions of adjacent magnets in the stack.

Example Timing and Control Method

FIGS. 27A and 27B show an example motor control and pulse recovery method. FIG. 27A is a cross section view of the crankshaft of the radial engine of FIG. 1 illustrating different positions during a revolution. FIG. 27B is a diagram showing the magnet stack position and direction at the positions designated in FIG. 27A.

In this example, the crankshaft position between 0 and 360 degrees is determined by a shaft encoder having 2500 encoder pulses per a full 360 degree crankshaft revolution. The motor magnet stack positions of all motors, including a first motor discussed below, are directly related to the crankshaft position. Therefore, shaft encoder information is used to determine when to provide power to motor coils, and when to recover energy from the motor coils.

For convenience, the term "forward stroke" designates the magnet stack being moved toward the crankshaft, and the term "back stroke" designates the magnet stack being moved away from the crankshaft. The term "Top Dead Center" or "TDC" designates the zero velocity position between the forward stroke and back stroke, and the term "Bottom Dead Center" or "BDC" designates the zero velocity position between the back stroke and the forward stroke.

For convenience, magnet stack position is designated as 1.00 inches at TDC and −1.00 inches at BDC for the 2.0 inch stroke of this example.

| Shaft Position (degrees) | Magnet Stack Position (inches) | COIL | | | |
|---|---|---|---|---|---|
| | | 58a | 58b | 58c | 58d |
| A | 0 | −1.00 (BDC) | | | |
| B | 11 | −0.88 | On | | On |
| C | 90 | 0 | On | | On |
| D | 169 | 0.88 | On | | On |
| E | 180 | +1.00 (TDC) | | | |
| F | 191 | 0.88 | | On | | On |
| G | 270 | 0 | | On | | On |
| H | 349 | −0.88 | | On | | On |

The controller receives and measures cumulative pulses from a shaft encoder, calculates the angular position of the crankshaft, determines whether the magnet stack of motor 1 should be in a forward stroke or back stroke, and determines whether to provide pulses to any coil.

In this example, at Position A, the controller recognizes that the crankshaft is at BDC with respect to motor 1, and no coils are supplied with voltage.

At Position B, the controller recognizes the end of the BDC dead band and provides voltage to Coils 58a and 58b. The controller recognizes that the crankshaft is in a position that motor 1 should be controlled in a forward stroke, and decides to provide pulses to coil 58a in order to provide repulsion to the magnet stack; and to provide pulses to coil 58c in order to provide attraction to the magnet stack. Thus, the pulses to Coils 58a and 58c provide a "push-pull" on the magnet stack as the magnet stack moves in a forward stroke. Coil 58a is exerting a push effect and Coil 58c is exerting a simultaneous pull effect as both coils are activated by a common trigger to get more force on the magnet stack 68.

If the crankshaft was turning before Position A, then the crankshaft and any associated flywheel will have sufficient momentum to drive the magnet stack through the "dead band" at BDC in order to complete the prior, active reverse stroke and start a new forward stroke. Then, after finishing the dead band, power is provided to the forward stroke coils to supply a net force back into the crankshaft.

At a nominal 600 RPM, a nominal 50 mSec stroke time can be chopped up into sequential coil pulses for the forward stroke portion of the motion and, likewise, a nominal 50 mSec can be chopped up into coil pulses to facilitate the back stroke. The period and duty of the PWM pulses are tuning parameters set in and used by the controller to energize the motor coils. The actual number of coil PWM pulses delivered to the engine during any given stroke can vary depending on the speed of rotation of the crank shaft achieved up to that point in time—the position of the crank shaft determines when the motor coils are turned on and off. If the crank shaft is turning slowly, like during startup, the controls will allow as many sequential PWM pulses to the motor coils as necessary to get the crank shaft to rotate to and through the appropriate control positions.

The controller continues to provide pulses to coils 58a and 58c as the shaft and magnet stack reach Position C.

As the magnet stack reaches Position D and nears TDC, the controller shuts off energy to the coils at 1175 encoder pulses where shaft position=169 degrees, motor stroke=0.88 inches, to avoid excess stress at the TDC that will occur at 1250 encoder pulses (shaft position=180 degrees, motor stroke=1.00 inch). No energy goes to motor 1 coils until the shaft encoder registers 1325 pulses which indicates that motor 1 magnet stack is safely past TDC.

The controller enables coils 58b and 58d to receive PWM pulses for attraction and repulsion, respectively, when the shaft encoder registers 1325 pulses at Position F (shaft position=191 degrees, motor stroke=0.88 inches.) The pulses to coils B and D drive the magnet stack back toward BDC.

The controller shuts off energy to coils 58b and 58d as the magnet stack reaches Position H near BDC (2425 encoder pulses, shaft position=349 degrees, motor stroke=−0.88 inches, to avoid excess stress at the BDC that will occur at 2500 encoder pulses (shaft position=360/0 degrees, motor stroke=−1.00 inches). No energy goes to motor 1 coils until the shaft encoder registers 75 pulses past BDC.

When the crankshaft passes through BDC, a separate pulse is generated indicating that a single rotation has just occurred. The computer recognizes this special pulse, and resets the encoder software in preparation for the accumulation of 75 encoder pulses to repeat the steps above for motor 1.

In multiple motor arrays, other motors or pairs of motors are being controlled in parallel. For instance, in the 6 motor radial array described above, there are 3 pairs of motors, with one pair of motors driven by the timing described in the steps above, and a second and third pair of motors with the TDC offsets of 120 and 240 degrees respectively.

In this example, pulse width modulation (PWM) is employed to provide 10 pulses in the nominal 50 msec forward stroke window. Each of the 10 pulses has a period of 5 msec, but the actual time that electrical power is delivered to the coils is a fraction of the total period. This pulse on time is termed "Duty" and is generally held to less than 50%.

With a 20% duty, a continuous pulse train runs at 200 Hz (5 msec period, 1 msec Duty), and these pulses only reach a motor coil when the angular position as measured by the shaft encoder and software dictate. Other motors in an array of motors may be controlled in the same manner. The software knows when, in paired rotational sequence, to turn coils on and off—and does so based on measured position, not based on speed or elapsed time, per se.

In an energy recovery strategy for this example, there is about 4 mSec between successive pulses. Some of this time between pulses can be used for coil collapse so that a subsequent induced energy pulse can be returned to a battery being charged, or otherwise recovered.

In an example, energy recovery begins when the trigger signal to a motor coil control switch (a large power transistor) is turned off, such as being on 1 msec. The way the transistor switch is turned off is that the previously-delivered charge in the transistor's gate circuit is drained off by the control circuit. This causes the transistor switch to very rapidly (less than 1 microsecond) drop from saturation and high conduction to its off state. The magnetic field in the motor coil under the control of the just-deactivated power transistor collapses, thereby causing a massive surge in stored energy to be released from the coil during the next msec, or so. This surge can be detected by monitoring the collector voltage of the transistor switch and that is seen to rise from nearly zero volts to several hundred volts in a few microseconds, which is enough electrical pressure to damage the transistor switch if means were not employed to protect the transistor switch.

Such protective means is provided in the form of a by-pass or "fly-back" diode connected to an electrically-conductive wire that returns to the positive terminal of a storage battery at about 50 VDC and/or a large capacitor in excess of 50 microfarad rated at 300 VDC. The voltage surge from the deactivated coil is shunted away from the transistor switch and is returned to the engine's power supply as useful, recovered energy. The rapid recovery of this energy is typically less than approximately 1 msec and that time is affected by the electrical impedance of the return wiring and associated dynamical load elements in place such as the load battery and or capacitors. Very low impedance is desired both to protect the transistor switches and to enhance energy recovery.

Energy Recovery Versus Surge Suppression

In prior art, when various solid-state devices were pressed into the role of performing some of the switching jobs normally performed by relays, the designers of such switch gear rapidly ran into some of the same problems that plagued relays. If the load being switched was a coil with any significant inductance, the kickback in voltage as caused by the collapse of the magnetic field in the coil burned the contacts in the relays, welded the contacts in a closed position, broke the contacts apart, or all of the above. The coils in relays were also susceptible to these problems.

A common design technique is to suppress voltage surges caused by inductive loads such as motor coils by including a by-pass or fly-back diode or some other form of active element inside the transistor chip's circuitry to shunt the nuisance pulse to ground when the transistor was turned off. This approach protects equipment, but does not attempt to recover useful energy from the coils.

In order to harvest pulses from the coils, the transistor "switch" should not have an embedded by-pass diode which routes the pulses to ground. In this control example, pulses are routed to another destination such as a load, charge battery, or storage capacitor. In one example, a diode connects the collector leg of an NPN transistor to the return wire to the positive electrode of the charge battery or storage capacitor. The diode is passive until a surge appears and then it conducts the surge away from the transistor and does so without the need of action or intervention from any other device in the system.

In another example, the motor control boards can have an embedded PWM chip under control via serial buss from the central microcomputer. This permits the control of duty from coil pulse to coil pulse so as to maximize engine power by taking advantage of more mechanical leverage available in the middle ⅔ of the stroke. That is, one could profile the power stroke. In another example, a microcontroller with 3 separate PWM channels may be used so that each pair of motors has a separate channel.

More advanced control strategies, such as a PID, 3-mode closed loop control software could be used to provide control strategies based on shaft RPM or generator KW, where the generator KW is measured by Hall Effect sensor on 1 or more of the 6 possible bridge rectifiers as used on the 6 linear generator outputs.

Heat Management

There are two major sources of heat rise—heat rise in the coils due to electrical resistance-based heating in the coils, and magnetically-induced eddy currents that cause heat rise in the magnetic shell. In the example above, the motor/generator assembly is not sealed. In other examples, heat dissipation can be achieved via forced air cooling and heat fins and/or laminated magnetic flux conducting structures.

In the example above, the bifilar, helical winding of a flat ribbon provides somewhat lower coil resistance combined with more induction-based impedance that reduces the in-rush current and coil heating. The deliberate increase in inductance augments the coil's ability to store energy Scale The current two inch stroke design is projected to be scaleable to smaller systems with perhaps a 0.25 inch stroke. As the size decreases, the accuracy of preparing and spacing the coils becomes more critical. One approach to smaller coils is to use flat, bifilar, spiral-wound coils that are confined in a planar geometry. Such coils may have enhanced intra-coil energy storage as well as collapsed axial geometry.

The linear element examples described above drive a magnet stack in a linear motion relative to a fixed coil. In other embodiments, the combination of magnet flux containment, tailored coil inductance, and high strength magnetic elements can be used in a wide range of geometries and with a variety of mechanisms to create relative movement between the coil(s) and the magnet stack. Some examples of other systems include rotary motors and generators; and the use of large or small vibratory systems to move either the coil(s) or the magnet stack. Thus there are a large number of configurations to provide high power density and efficient pulse recovery in systems ranging from micromachines to very large applications.

Constrained Magnet Stacks

In the examples described above, the magnet stack is designed to move within the flux containment shell. In other embodiments, a simplified system may be provided where the magnet stack is either constrained to a fixed position within the flux containment shell and the coil(s) are moved; or the magnet stack is permitted to move within the shell without a mechanical linkage to a drive rod or crank shaft. These are examples of linear elements where the device serves as a transformer to convert an input voltage from a solar panel, battery, capacitor, or other source to voltage pulses.

AC Input Voltage

In the examples described above, a DC voltage is provided to the linear elements. In other embodiments, an AC power source may be used. For example, an AC 60 Hz signal fed to the voice coil of an audio speaker produces an irritating hum—however the principle illustrates how an AC signal could move a piston, a rod, a magnet, or another coil as attached to the "voice coil"—an AC actuator by another name.

Variable Supply Voltage

The system described above uses PWM and a fixed excitation voltage. A variable excitation voltage may be obtained with finer gauge wire for coils, many more turns in the coils, and higher voltage with a hypothesis that voltage field effects could provide improved performance.

Example—Renewable Resources

In this example, internal combustion engine components and materials are replaced by an improved linear, reciprocating electromagnetic motor (with linear generator) so that energy from renewable sources such as solar displaces fossil fuels; magnetically-permeable, ferrous metal canisters displace combustion cylinders; stacks of Neodymium magnets eliminate pistons and leaky piston Rings; electronic circuits displace mechanical valves, cams, and linkages; electromagnetic coils of magnet wire displace spark plugs; and pollution is thus reduced.

Combined Motor and Generator

The engine example described above embodies pairs of motors and generators in separate planes. An alternative configuration is to connect a motor and generator together in the same plane by extending the magnet stack link rod anterior end and linking it to a generator link rod interior end. The motor/generator assembly can then be augmented by extending the interior end of the motor link rod and attaching it to a more conventional crankshaft that includes an eccentric flywheel along the lines of what was used in steam engines. The terms "interior" and "anterior" refer to the ends of link rods in the example above that point towards, and away from the crank shaft, respectfully.

Applications

Elements and combinations of elements such as those described in the examples above are useful for charging batteries and capacitors with recovered coil voltage pulses. The examples described above generate large voltage gradients. For instance, a 24 volt input creates voltage gradients in excess of 24 megavolts per second when pulses are switched on and off with a rise and fall time of less than 1 microsecond. These large voltage gradients, even with very low current, are useful in applications such as battery charging, capacitor charging, and electrochemical processes. Voltage gradients may be deliberately enhanced by coil design, flux containment structures, and strong magnets or magnet arrays, and then harvested from the engine, or from a single linear element, without additional operating cost. In prior art systems, rebound transients are typically deliberately suppressed.

In other examples, a motor can be combined with a prime mover such as a pump or compressor. This combination provides an opportunity to perform a task such as pumping, while also recovering useful voltage pulses. Example pumps include diaphragm pump and piston-type pumps which can be operated with solar power or a power supply. In a ground water heat pump application linear motors could push water to/through a heat exchanger and run a refrigerant compressor in various configurations. A linear motor can be adapted to provide a pump on each end of the magnet stack to double the volumetric flow.

The pump system can include other features, such as water purification where a generator or recovered pulses run an ozonator and/or combined with a UV/fluorescent light cell to disinfect that water. Pulse recapture reduces system footprint and cost.

The high power density of motors, such as those described above, permits the use of a distributed system of small motors to replace a single large motor or engine. For example, large diesel locomotive engines can be replaced by smaller motors, such as 100 HP motors driving individual train car wheels with distributed digital control to provide a more powerful and safer train.

Centrifugal pumps and other rotary devices which are generally run with rotary AC motors can be run from a crank shaft similar to the mechanism described above in the linear radial array.

It is to be understood that the specific embodiments and examples described above are by way of illustration, and not limitation. Various modifications may be made by one of ordinary skill, and the scope of the invention is as defined in the appended claims.

What is claimed is:

1. A first linear actuator comprising
    a magnetically permeable ferrous outer flux containment shell;
    a magnet core assembly disposed within the outer shell, the magnet core assembly comprising
        a magnet stack comprising one or more permanent magnets, and
        a first coil comprising at least one wire loop around at least a portion of the magnet stack, such that the outer shell provides magnetic flux containment and routing, and the magnet stack is self-levitating; and
    an energy recovery mechanism comprising
        a switch having a first connection to the first coil and a second connection to a recovery element, the switch having an open position and a closed position; and
        a pulse recovery controller, such that the pulse recovery controller directs the switch between the open position and the closed position.

2. The linear actuator of claim 1 wherein
    the one or more permanent magnets are are Neodymium-Iron-Boron magnets; and
    the outer flux containment shell meets ASTM A848 material standards.

3. The linear actuator of claim 1 wherein the outer flux containment shell further comprises
    two cylindrical canister portions each having a distal end and a proximal end;
    a first end cap attached to the distal end of each canister; and
    a second end cap attached to the proximal end of each canister.

4. The linear actuator of claim 1 wherein the first coil is a bifilar coil.

5. The linear actuator of claim 1 further comprising
    a plurality of coils, such that the coils are positioned asymmetrically with respect to the magnet stack , such that the pole of a magnet does not align with the center of any coil at the ends of a magnet stack stroke.

6. The linear actuator of claim 1 wherein
    the magnet stack further comprises at least one spacer positioned between adjacent permanent magnets.

7. A system comprising
    a first linear actuator motor comprising
        a magnetically permeable outer flux containment shell, and a magnet core assembly disposed within the outer flux containment shell, the magnet core assembly comprising
  a magnet stack comprising one or more permanent magnets, and
  a plurality of coils, each coil comprising at least one wire loop around at least
    a portion of the magnet stack, such that the outer flux containment shell provides magnetic flux containment and routing, and the magnet stack is self-levitating; and
a first linear actuator generator comprising
  a magnetically permeable outer flux containment shell; and
  an magnet core assembly disposed within the outer flux containment shell, the magnet core assembly comprising
    a magnet stack comprising one or more permanent magnets, and
    a first coil comprising at least one wire loop around at least a portion of the magnet stack, such that the outer flux containment shell provides magnetic flux containment and routing, and the magnet stack is self-levitating.

8. The system of claim 7 further comprising
an energy recovery mechanism comprising
  a switch having a first connection to the first coil and a second connection to a recovery element, the switch having an open position and a closed position; and
  a pulse recovery controller, such that the pulse recovery controller directs the switch between the open position and the closed position.

9. The system of claim 8 wherein the recovery element is a battery or capacitor.

10. The system of claim 8 further comprising
a renewable energy power source; and
a plurality of pairs of linear actuator motors and linear actuator generators arranged in a radial array, the plurality of pairs of linear actuator motors and linear actuator generators connected to a common crankshaft.

11. The system of claim 10 further comprising
a control system comprising
  speed and position sensors attached to the crankshaft, and
  a plurality of controllers, such that the controllers deliver power voltage to motor coils based on the speed and position of the crankshaft.

12. The system of claim 10 wherein
each of the plurality of generators comprises an opposed pole armature with a magnet stack having a first magnet and a second magnet arranged with like poles facing.

13. An electromagnetic motor energy recovery method comprising
  providing a first linear actuator motor comprising
    a magnetically permeable outer shell,
    an magnet core assembly disposed within the outer shell, the magnet core assembly comprising
      a magnet stack comprising one or more permanent magnets, and
      a plurality of coils in proximity to the magnet stack, such that the outer shell provides magnetic flux containment and routing, and the magnet stack is self-levitating, and
    a controller;
  levitating the magnet stack within the outer shell of the first linear actuator;
  applying, with the controller, a plurality of supply voltage pulses to one or more of the plurality of coils over a first time interval, thereby causing the magnet stack to move in a first direction;
  recovering energy from the one or more of the plurality of coils by establishing, at a second time interval, an electrical connection between the one or more of the plurality of coils and a pulse recovery element.

14. The electromagnetic motor energy recovery method of claim 13 wherein
  providing a first linear actuator further comprises
    providing an ASTM A848 magnetically permeable outer shell.

15. The electromagnetic motor energy recovery method of claim 13 wherein
  providing a first linear actuator further comprises
    providing a magnet stack comprising one or more Neodymium-Iron-Boron magnets magnets.

16. The electromagnetic motor energy recovery method of claim 13 wherein
  providing a first linear actuator further comprises
    providing a plurality of bifilar coils.

17. The electromagnetic motor energy recovery method 14 further comprising
  driving a first linear actuator generator with the first linear actuator motor.

18. The electromagnetic motor energy recovery method 14 further comprising
  providing at least one battery or capacitor as the pulse recovery element.

19. The electromagnetic motor energy recovery method 14 further comprising
  configuring the first linear actuator motor as a positive displacement device.

* * * * *